US010162687B2

(12) United States Patent
Gorbatov et al.

(10) Patent No.: US 10,162,687 B2
(45) Date of Patent: Dec. 25, 2018

(54) SELECTIVE MIGRATION OF WORKLOADS BETWEEN HETEROGENEOUS COMPUTE ELEMENTS BASED ON EVALUATION OF MIGRATION PERFORMANCE BENEFIT AND AVAILABLE ENERGY AND THERMAL BUDGETS

(71) Applicant: Intel Corporation, Santa Clara, CA (US)

(72) Inventors: Eugene Gorbatov, Portland, OR (US); Alon Naveh, Sausalito, CA (US); Inder M. Sodhi, Folsom, CA (US); Ganapati N. Srinivasa, Portland, OR (US); Eliezer Weissmann, Haifa (IL); Guarav Khanna, Hillsboro, OR (US); Mishali Naik, Santa Clara, CA (US); Russell J. Fenger, Beaverton, OR (US); Andrew D. Henroid, Portland, OR (US); Dheeraj R. Subbareddy, Hillsboro, OR (US); David A. Koufaty, Portland, OR (US); Paolo Narvaez, Wayland, MA (US)

(73) Assignee: Intel Corporation, Santa Clara, CA (US)

( * ) Notice: Subject to any disclaimer, the term of this patent is extended or adjusted under 35 U.S.C. 154(b) by 890 days.

(21) Appl. No.: 13/730,800

(22) Filed: Dec. 28, 2012

(65) Prior Publication Data

US 2014/0189301 A1    Jul. 3, 2014

(51) Int. Cl.
*G06F 9/50* (2006.01)
*G06F 1/32* (2006.01)
*G06F 1/20* (2006.01)

(52) U.S. Cl.
CPC .......... *G06F 9/5094* (2013.01); *G06F 1/3206* (2013.01); *G06F 1/206* (2013.01); *Y02D 10/16* (2018.01); *Y02D 10/22* (2018.01)

(58) Field of Classification Search
CPC .......... G06F 1/3234; G06F 1/329; G06F 9/46; G06F 9/5088; G06F 9/5094; G06F 9/5044
See application file for complete search history.

(56) References Cited

U.S. PATENT DOCUMENTS 8,028,295 B2 *   9/2011   Chinya ................. G06F 9/3009
                                            712/228
8,284,205 B2 *  10/2012   Miller et al. ................. 345/502
(Continued)

FOREIGN PATENT DOCUMENTS

CN       101076770 A      11/2007
CN       101464813 A       6/2009
(Continued)

OTHER PUBLICATIONS

International Search Report and Written Opinion received for PCT Patent Application No. PCT/US2013/047706, dated Sep. 25, 2013, 9 pages.
(Continued)

*Primary Examiner* — David J. Huisman
(74) *Attorney, Agent, or Firm* — NDWE, LLP

(57) ABSTRACT

A processor of an aspect includes at least one lower processing capability and lower power consumption physical compute element and at least one higher processing capability and higher power consumption physical compute element. Migration performance benefit evaluation logic is to evaluate a performance benefit of a migration of a workload from the at least one lower processing capability compute element to the at least one higher processing capability compute element, and to determine whether or not
(Continued)

to allow the migration based on the evaluated performance benefit. Available energy and thermal budget evaluation logic is to evaluate available energy and thermal budgets and to determine to allow the migration if the migration fits within the available energy and thermal budgets. Workload migration logic is to perform the migration when allowed by both the migration performance benefit evaluation logic and the available energy and thermal budget evaluation logic.

25 Claims, 12 Drawing Sheets

(56) References Cited

U.S. PATENT DOCUMENTS

| | | | |
|---|---|---|---|
| 2006/0095807 A1* | 5/2006 | Grochowski et al. | 713/324 |
| 2007/0067136 A1* | 3/2007 | Conroy et al. | 702/130 |
| 2008/0222435 A1 | 9/2008 | Bolan et al. | |
| 2009/0007120 A1 | 1/2009 | Fenger et al. | |
| 2009/0158072 A1* | 6/2009 | Radhakrishnan et al. | 713/340 |
| 2009/0271646 A1* | 10/2009 | Talwar et al. | 713/322 |
| 2010/0180275 A1* | 7/2010 | Neogi et al. | 718/1 |
| 2010/0268912 A1 | 10/2010 | Conte et al. | |
| 2011/0055604 A1 | 3/2011 | Jackson et al. | |
| 2011/0088041 A1* | 4/2011 | Alameldeen et al. | 718/105 |
| 2012/0130680 A1 | 5/2012 | Zink et al. | |
| 2012/0317568 A1* | 12/2012 | Aasheim | 718/1 |
| 2012/0324250 A1 | 12/2012 | Chakraborty et al. | |
| 2013/0160003 A1* | 6/2013 | Mann et al. | 718/1 |
| 2014/0189704 A1 | 7/2014 | Narvaez et al. | |

FOREIGN PATENT DOCUMENTS

| | | |
|---|---|---|
| CN | 102695998 A | 9/2012 |
| WO | 2014/105175 A1 | 7/2014 |

OTHER PUBLICATIONS

International Preliminary Report on Patentability and Written Opinion Received for PCT Patent Application No. PCT/US2013/047706, dated Jul. 9, 2015, 6 pages.

Office Action and Search Report received for Chinese Patent Application No. 201380059052.X, dated Oct. 9, 2017, 23 pages of Chinese Office Action including 13 pages of English Translation.

* cited by examiner

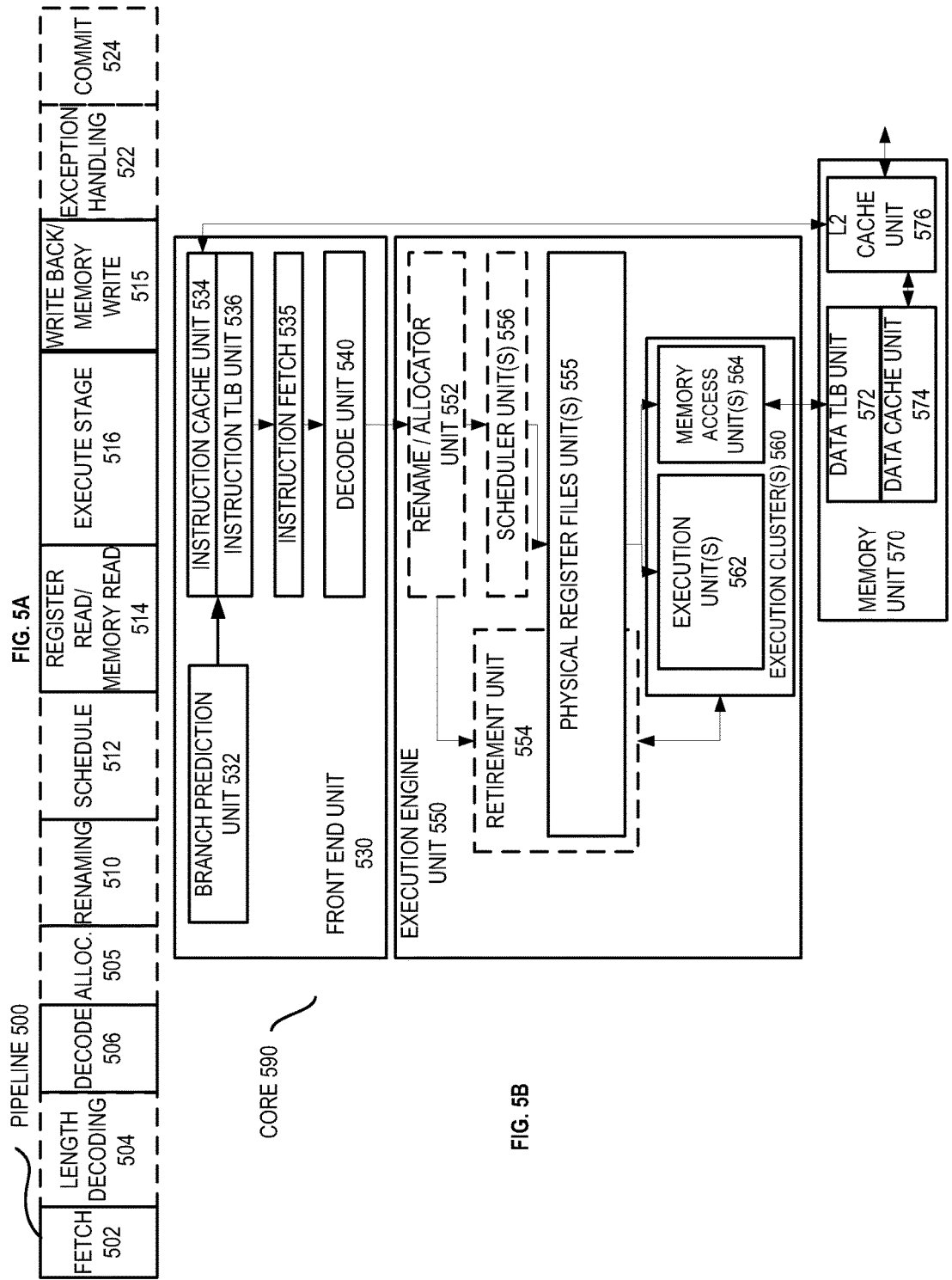

SELECTIVE MIGRATION OF WORKLOADS BETWEEN HETEROGENEOUS COMPUTE ELEMENTS BASED ON EVALUATION OF MIGRATION PERFORMANCE BENEFIT AND AVAILABLE ENERGY AND THERMAL BUDGETS

BACKGROUND

Field

Embodiments relate to processors. In particular, embodiments relate to processors having heterogeneous cores or other computing elements.

Background Information

Heterogeneous core processor architectures may offer advantages over homogenous core processor architectures because more than one type of core is available to perform computational tasks. Different types of cores generally tend to be better suited than others at performing different tasks. For example, core type A may be faster than core type B at performing task X, but core type A may be slower than core type B at performing task Y. As a result, a processor that has both a core type A and a core type B will generally be more efficient at performing a combination of tasks X and Y than a processor that only has core type A or core type B but not both.

Despite the potential advantages offered by heterogeneous core processor architectures, few commercial examples of such architectures currently exist. Often such architectures need software (e.g., the operating system) to know how to schedule tasks to the heterogeneous cores in order to take advantage of their different capabilities. However, currently, there is very limited to no support from the major operating systems, such as Windows® and Linux, for harnessing the different capabilities of heterogeneous cores. Moreover, as the processors and their heterogeneous cores change over time, it generally tends to be difficult and costly to modify the operating systems so that they remain consistent with the changes and are able to harness the benefits provided by the heterogeneity of the cores.

BRIEF DESCRIPTION OF THE SEVERAL VIEWS OF THE DRAWINGS

The invention may best be understood by referring to the following description and accompanying drawings that are used to illustrate embodiments of the invention. In the drawings:

FIG. 5A is a block diagram illustrating both an exemplary in-order pipeline and an exemplary register renaming, out-of-order issue/execution pipeline according to embodiments of the invention.

FIG. 5B is a block diagram illustrating both an exemplary embodiment of an in-order architecture core and an exemplary register renaming, out-of-order issue/execution architecture core to be included in a processor according to embodiments of the invention.

DETAILED DESCRIPTION

Figure 1:
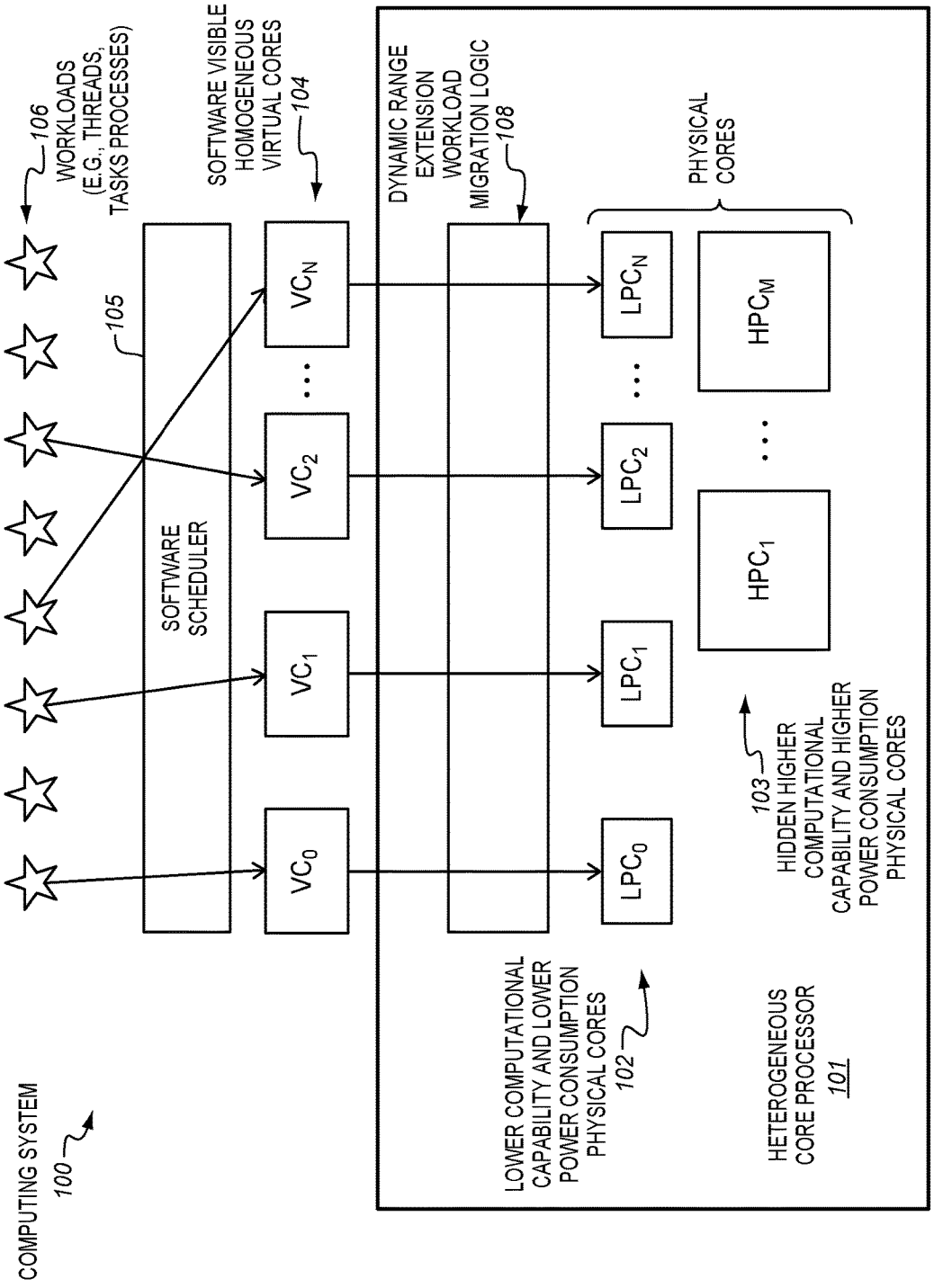
FIG. 1 is a block diagram of a computing system having an embodiment of a heterogeneous core processor and an embodiment of dynamic range extension workload migration logic.

Disclosed herein are heterogeneous compute element processors, methods, and systems that are operable to utilize the heterogeneous compute elements to achieve high dynamic range with software transparency. In the following description, numerous specific details are set forth (e.g., specific types and numbers of heterogeneous compute elements, logic implementations and microarchitectural details, logic partitioning/integration details, power/thermal budget criteria, sequences of operations, types and interrelationships of system components, and the like). However, it is understood that embodiments of the invention may be practiced without these specific details. In other instances, well-known circuits, structures and techniques have not been shown in detail in order not to obscure the understanding of this description.

Mobile, battery powered, and/or small computing devices generally benefit from the capability of having a high dynamic range in terms of power consumption and computational capability or performance. Examples of such devices include, but are not limited to, laptops, tablets, netbooks, smart phones, cellular phones, handheld computing devices, media players, and other mobile, battery powered, and/or small computing devices. Such devices are increasingly being designed to operate within ever lower power and thermal envelopes. For one thing, such devices are often powered by batteries or other limited power supplies, which tends to make power conservation important. For another thing, many of such devices are often deployed with small form factors, which tend to limit the sizes of the batteries and/or restrict the thermal envelopes. At the same time, such devices are increasingly being used for more computationally intensive tasks and expected to have better performance (e.g., due to more multimedia content, more sophisticated applications, etc.). Accordingly, in such devices it is generally beneficial to be able to balance power, thermal, and computational performance related objectives.

Embodiments of heterogeneous compute element processors disclosed herein, which have cores or other compute elements with different power consumptions and computational capabilities, may be used to provide high dynamic range in terms of power consumption and computational capability or performance, in order to help balance these different objectives. Many mobile, battery powered, and/or small computing devices tend to be powered on but idle for relatively long periods of time, and are only needed for heavy computing and/or high performance over relatively short periods of time. In some embodiments, lower computational capability and lower power consumption compute elements may be used over such prolonged periods of time when heavy computing is not needed in order to save power, while higher computational capability and higher power consumption compute elements may be used over relatively short periods of time when heavy computing is beneficial, within the available energy and thermal envelopes.

FIG. 1 is a block diagram of a computing system 100 having an embodiment of a heterogeneous core processor 101. In some embodiments, the heterogeneous core processor may be a general-purpose processor (e.g., of the type used in desktop, laptop, and like computers). Alternatively, the processor may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers), to name just a few examples.

The heterogeneous core processor has heterogeneous physical cores with different computational characteristics and in some but not all cases different power consumption characteristics. In particular, the heterogeneous physical cores include a set of one or more lower computational capability and in some cases lower power consumption physical cores 102 and a set of one or more higher computational capability and in some cases higher power consumption physical cores 103. As used herein, the terms "lower" and "higher" are relative terms, which are relative to one another, not absolute terms. For example, the lower power cores use less power than the higher power cores, etc. In the illustration, the different sizes of the physical cores are used to designate the relative amounts of logic and/or computational capability.

Generally, if a core has more logic, then its computational capability tends to be greater, but its power consumption also tends to be greater. Conversely, a smaller core generally tends to use less power, but also tends to have less computational capability. Thus, the higher computational capability and higher power consumption cores may represent "bigger" cores, whereas the lower computational capability and lower power consumption cores may represent "smaller" cores. Again, the terms "bigger" and "smaller" are used herein as relative not absolute terms. However, it is not required that a higher computational capability compute element needs to have more logic and/or higher power consumption than a lower computational capability compute element. For example, specialized or customized logic that is highly efficient at performing certain types of tasks may be able to perform those tasks with higher performance without necessarily needing to have more logic and/or higher power consumption. For example, a general-purpose core designed to be efficient at task X (e.g., web browsing, video decompression, etc.) may be more efficient and faster at performing task X than another type of general-purpose core. Migration may be performed to such a higher computational capability compute element in order to extend the computational or performance dynamic range without necessarily incurring more power consumption. Often, in the present description, lower computational capability and lower power consumption compute elements, and higher computational capability and higher power consumption compute elements, are often used. However, in other embodiments, the higher computational capability compute elements may have the same or even lower power consumption than the lower computational capability compute elements.

Referring again to FIG. 1, in the illustrated embodiment, the set of lower computational capability and lower power consumption physical cores 102 include cores $LPC_0$ through $LPC_N$ and the set of higher computational capability and higher power consumption physical cores 103 include cores $HPC_0$ through $HPC_M$. The numbers N and M may be any appropriate numbers desired for the particular implementation. Often there may be anywhere from one (e.g., in a media player or other simple computing device) to hundreds (e.g., in a laptop or other sophisticated computing device) of each of the lower computational capability and lower power consumption and higher computational capability and higher power consumption physical cores.

In one particular example, there may be between 1 to 30 of the lower computational capability and lower power consumption cores, and between 1 to 30, 1 to 10, or 1 to 5, of the higher computational capability and higher power consumption cores. In some embodiments, there may be less higher computational capability and higher power consumption cores than lower computational capability and lower power consumption cores, although this is not required. In the illustration, for simplicity only two different types of heterogeneous cores are shown, although other embodiments may have three or more different types of heterogeneous cores (e.g., a third size of core intermediate between those illustrated, compute elements customized for particular tasks, etc.).

The heterogeneous cores represent one embodiment of heterogeneous compute elements or processing elements. In other embodiments, other types of heterogeneous compute elements or processing elements may be used instead of cores. Other suitable examples of heterogeneous compute elements or processing elements include, but are not limited to, hardware accelerators, fixed function accelerators, graphics processing units, specialized processing units, functional units, execution units, vector execution units, and the like, and combinations thereof. In this description heterogeneous cores are often as example embodiments of the heterogeneous compute elements or processing elements, although any combination of the above described compute elements or processing elements may alternatively be used.

Referring again to the illustration, the processor may present or expose a set of one or more virtual cores 104 to a software scheduler 105. Often the software scheduler may be part of an operating system. In some embodiments, the virtual cores may appear to the software scheduler as homogeneous cores as opposed to heterogeneous cores. In the illustration this is designated by the exposed virtual cores all being of the same size. Exposing the virtual homogeneous cores to the software may effectively hide the heterogeneous nature of the physical cores from the software. The software scheduler may schedule threads, tasks, software processes, or other workloads 106 to execute on the exposed homogeneous virtual cores (shown in the illustration by the arrows) as it would in a true homogeneous multi-core processor or multi-processor system. Advantageously, this may help to avoid needing to design the software scheduler and/or the operating system to harness the benefits provided by the heterogeneous physical cores. Moreover, this may also help to avoid needing to modify the software scheduler and/or the operating system when the processor or physical cores change over time.

In some embodiments, there may be a default one-to-one mapping between the exposed software visible virtual cores and the lower computational capability and lower power consumption physical cores. In the illustration, this is shown by arrows connecting the virtual cores to respective ones of the lower computational capability and lower power consumption physical cores. For example, $VC_0$ is default mapped to $LPC_0$, $VC_1$ is default mapped to $LPC_1$, and so on. Alternatively, other types of default mappings and/or dynamic mappings between the virtual cores and the lower computational capability and lower power consumption physical cores may be used instead. As another example, the correspondence may be dynamic (e.g., a virtual core (e.g., $VC_2$) may be remapped from one physical core (e.g., $LPC_2$) to another (e.g., $LPC_1$) for power, memory access latency, or reasons. Accordingly, although in the illustrated embodiment a static one-to-one default mapping is shown, other embodiments may use either static or dynamic, and not necessarily one-to-one, mappings between the virtual cores and the lower computational capability and lower power consumption physical cores.

Referring again to FIG. 1, the processor includes an embodiment of dynamic range extension workload migration logic 108. The dynamic range extension workload migration logic may be implemented in hardware (e.g., integrated circuitry, transistors, etc.) and/or firmware (e.g., microcode stored in non-volatile memory) of the processor potentially combined with some software. The dynamic range extension workload migration logic is coupled with the heterogeneous physical cores and is logically disposed between the software exposed virtual cores and the heterogeneous physical cores. The dynamic range extension workload migration logic may be operable to balance power consumption and performance and/or extend the dynamic range of the computing system.

The lower computational capability and lower power consumption cores (e.g., the smaller cores) and the higher computational capability and higher power consumption cores (e.g., the bigger cores) provide a tradeoff between power consumption and computational capability. The smaller cores are more power efficient but have less computational capability and provide less performance, whereas the larger cores have more computational capability and provide better performance (e.g., higher average instruction execution rate) but consume more power (e.g., higher average power consumed per instruction executed). By including both the lower and higher computational capability and higher power consumption cores (or other compute elements), the dynamic range extension workload migration logic may achieve a good balance of power consumption and energy efficiency.

In embodiments the dynamic range extension workload migration logic may be operable to migrate, move, or remap threads, tasks, software processes, other workloads, and/or virtual cores between a lower computational capability and lower power consumption physical core and a higher computational capability and higher power consumption physical core. For example, a thread scheduled by the software scheduler on a virtual core (e.g., $VC_1$) may be moved from a lower computational capability and lower power consumption physical core (e.g., $LPC_1$) to a higher computational capability and higher power consumption physical core (e.g., $HPC_1$). For example, in some embodiments, the lower computational capability and lower power consumption cores may be used over prolonged periods of time when heavy computing and/or high performance is not needed in order to save power. Selectively, the higher computational capability and higher power consumption cores may be used over shorter periods of time when heavy computing and/or high performance is beneficial or desired by the user as long as the energy and thermal envelopes allow. In other embodiments, as described above, the higher performance cores need not necessarily have more logic and/or more power consumption (e.g., they may instead be more efficient at performing the workloads).

To further illustrate how workload migration may occur in one embodiment, consider the following example. Processors are commonly used in a multitasking scenario that includes a relatively light and continuous computational workload together with a relatively heavy and bursty computational workload. For example, this may occur when a user is listening to music while browsing the web. Playing music on a media player application is generally characterized by relatively continuous but low computational workload associated with decoding the compressed music stream. Such workloads tend to be well suited for the lower computational capability and lower power consumption cores, since they provide the needed level of performance while also providing lower power consumption over prolonged periods of time. On the other hand, a browser application may be idle and have low computational workload much of the time, but have bursty and high computational workload at times (e.g., after a request by the user to provide web content). When the browser application becomes active there is generally a sudden increase in the computational workload. In some embodiments, when the browser application becomes active, a corresponding thread may be migrated from a lower computational capability and lower power consumption core to a higher computational capability and higher power consumption core in order to provide rapid performance enhancement over the short bursty periods while the energy/thermal budget permits. Then, after the short bursty period, or when the energy/thermal budget is no longer available, the thread for the browser application may be migrated back to the lower computational capability and lower power consumption core in order to save power.

Advantageously, the heterogeneous architecture processor is able to use the heterogeneous cores or other compute elements to extend the dynamic range of the system. This may be done transparently to the software (e.g., the software scheduler, the operating system, a virtual machine monitor, a micro-kernel, etc.). In a conventional system, the assignment of tasks and threads to cores is done by the software (e.g., the operating system). However, in some embodiments herein, the software may not know of the heterogeneous compute elements (e.g., they may be software invisible), or at least does not need to be the entity to move the workloads to the heterogeneous compute elements. Rather, legacy software may continue to schedule tasks and threads to the homogeneous virtual compute elements exposed by the processor without needing to be modified to be aware of the heterogeneous architecture. In order to improve dynamic range, the processor may dynamically migrate, move, or remap these workloads to the software-invisible higher computational capability compute elements (e.g., when higher performance is desired and is within the available energy/thermal budgets).

Figure 2:
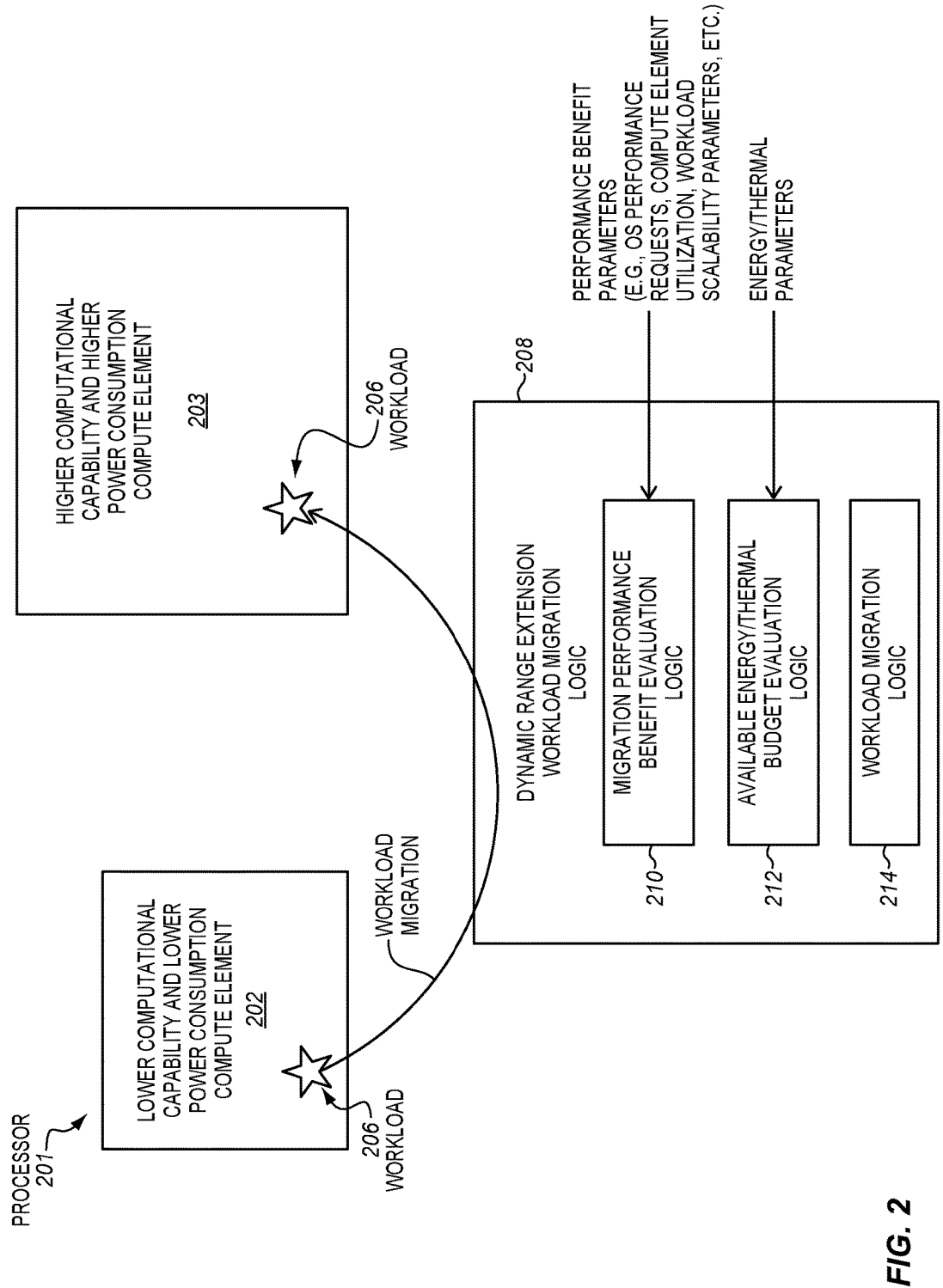
FIG. 2 is a block diagram of an embodiment of a processor having heterogeneous compute elements and an embodiment of dynamic range extension workload migration logic.

FIG. 2 is a block diagram of an embodiment of a processor 201 having heterogeneous compute elements 202, 203 and an embodiment of dynamic range extension workload migration logic 208. The heterogeneous compute elements include at least one lower processing capability and in some cases lower power consumption physical compute element 202 (e.g., a smaller core) and at least one higher processing capability and in some cases higher power consumption physical compute element 203 (e.g., a larger core). The dynamic range extension workload migration logic is operable to migrate a workload 206 from the at least one lower processing capability and lower power consumption physical compute element to the at least one higher processing capability and higher power consumption physical compute element. In other embodiments, the higher computational capability compute element need not necessarily be larger or have higher power consumption.

The dynamic range extension workload migration logic 208 includes migration performance benefit evaluation logic 210. The migration performance benefit evaluation logic is operable to evaluate a performance benefit of the migration of the workload from the at least one lower processing capability and lower power consumption physical compute element to the at least one higher processing capability and higher power consumption physical compute element. As shown, in some embodiments, the evaluation may be based on one or more performance benefit parameters. Examples of such parameters include, but are not limited to, software (e.g., operating system) performance requests, compute element utilization levels, workload scalability parameters, scalability in terms of performance per unit power (e.g., performance per watt), and the like, and combinations thereof. The workload scalability parameters may be used to help quantify how scalable the workload is from the lower computational capability compute element to the higher computational capability compute element in terms of performance benefit. The migration performance benefit evaluation logic is operable to determine whether or not to allow the migration based on the evaluated performance benefit. In some embodiments, if the evaluated performance benefit is sufficiently high (e.g., meets a threshold) then the migration may be allowed. Otherwise, if the evaluated performance benefit is not sufficiently high (e.g., does not meet the threshold) then the migration may not be allowed.

The dynamic range extension workload migration logic 208 also includes available energy and/or thermal budget evaluation logic 212. The available energy/thermal budget evaluation logic is operable to evaluate available energy and/or thermal budgets of the processor and to determine to allow the migration if the migration fits within the available energy and/or thermal budgets. As shown, in some embodiments, the evaluation may be based on one or more energy and/or thermal parameters. Examples of such parameters include, but are not limited to, measured temperatures (e.g., junction, skin, etc.), measured energy and/or power consumption, current delivery parameters, power delivery parameters, and the like, and combinations thereof. If the migration does not fit within the available energy/thermal budgets the migration may not be allowed.

The dynamic range extension workload migration logic 208 also includes workload migration logic 214. The workload migration logic is operable to perform the migration of the workload when allowed by both the migration performance benefit evaluation logic and the available energy and thermal budget evaluation logic. In some embodiments, the workload migration logic may migrate the workload transparently to software. The dynamic range extension workload migration logic may also migrate the workload back when appropriate (e.g., when the achievable performance benefit and/or the energy/thermal budget is no longer sufficient).

Figure 3:
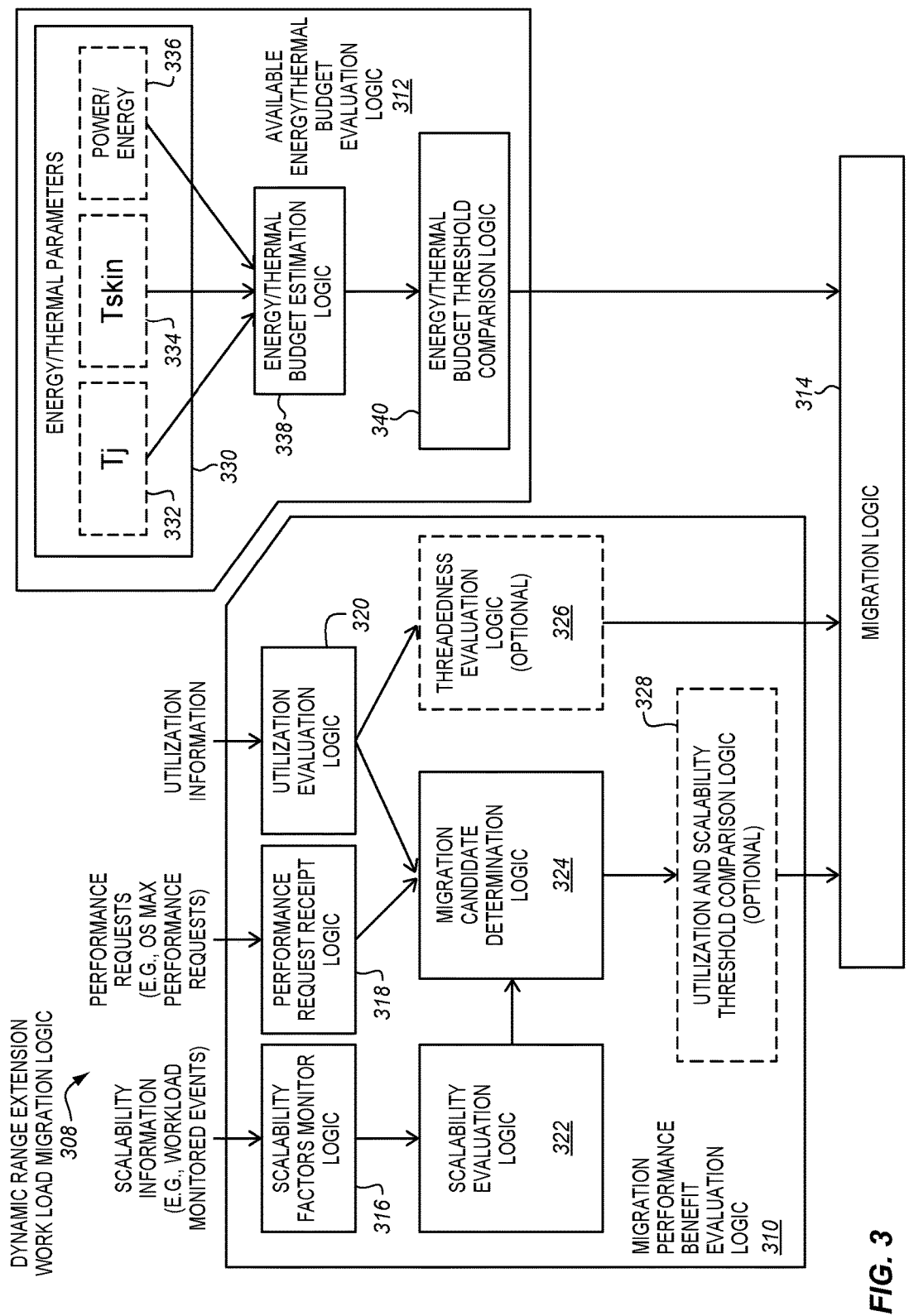
FIG. 3 is a block diagram of a detailed example embodiment of dynamic range extension workload migration logic.

FIG. 3 is a block diagram of an embodiment of dynamic range extension workload migration logic 308. In some embodiments, the logic of FIG. 3 may be included in the processor of FIG. 2 or the system of FIG. 1. Alternatively, the logic of FIG. 3 may be included in a similar or entirely different processor or system. Moreover, the processor of FIG. 2 and the system of FIG. 1 may include either the same, similar, or entirely different dynamic range extension workload migration logic than that of FIG. 3.

The dynamic range extension workload migration logic includes performance request receipt logic 318 to receive performance requests. In some embodiments, the performance request receipt logic may receive performance requests from software (e.g., an operating system, a user-mode governor, a managed runtime, or the like) for particular threads, tasks, software processes, or other workloads (or for the compute elements processing those workloads). For example, the operating system may issue requests for a relatively high or highest performance state (e.g., a P0 state, an Intel Turbo Boost state, other high or highest performance states, or the like). In some embodiments, any such workloads or compute elements for which such performance requests are received may be considered as candidates that are eligible for consideration by the processor logic for migration from a lower computational capability compute element to a higher computational capability compute element. In some embodiments, such migration is only evaluated by the processor logic after receipt of such performance requests from the operating system. Alternatively, in other embodiments, the processor logic may be operable to autonomously determine to perform such migration without needing to receive such performance requests from software.

In some embodiments, the processor logic does not automatically perform migration in response to receipt of a performance request from software. Rather, in some embodiments, the processor logic may estimate the benefit of the migration and determine whether or not to perform the migration based on the estimated benefit (e.g., determine to perform the migration if the estimated benefit is sufficiently great or otherwise determine not to perform the migration). That is, the migration may be conditioned on whether or not a sufficient performance improvement is expected to be achieved. In some embodiments, if performance requests are received for multiple workloads, the expected benefits of migrating each of the workloads may be compared to determine the relatively better candidates for migration (e.g., those that would benefit most from migration). Moreover, in some embodiments, the processor logic may evaluate the current energy/thermal budget and determine whether or not to perform the migration based on the current energy/thermal budget (e.g., determine to perform the migration if the estimated benefit is sufficiently great and there is sufficient energy/thermal budget to accommodate the migration).

The dynamic range extension workload migration logic 308 includes migration performance benefit evaluation logic 310 that is operable to evaluate the performance benefit of a migration from a lower computational capability and often lower power consumption compute element to a higher computational capability and often higher power consumption compute element. A particular detailed example of the migration performance benefit evaluation logic is shown, although the scope of the invention is not so limited.

The migration performance benefit evaluation logic includes utilization evaluation logic 320. The utilization evaluation logic is operable to evaluate the utilization of the cores or other compute elements for which the performance requests were received. In some embodiments, this may also be done for any active higher computational capability and higher power consumption compute elements. The utilization basically indicates the level of activity or use of the cores or other compute elements over a recent period of time. In some embodiments, the utilization may indicate the business or level of activity of the cores or other compute elements from the perspective of system software (e.g., the operating system). For example, a higher utilization may indicate a higher demand for performance from the operating system. Various different ways of expressing or quantifying utilization are contemplated. In some embodiments, utilization may be expressed as the ratio of un-halted clock cycles to total clock cycles (i.e., the proportion of the total clock cycles that are un-halted). In other embodiments, utilization may be expressed in other ways (e.g., based on number of instructions retired per unit of time, instruction execution rate, information from performance or workload monitoring logic, etc.).

In some embodiments, in addition to core utilization, scalability may also be included in the migration benefit evaluation. The utilization level of a core or other compute element is one factor that affects the expected benefit of the migration but is not the only factor. In some cases, a core or other compute element with the highest utilization may not be the best candidate for migration, even though it is very active, if it would not benefit significantly from the migration (e.g., if it would not benefit from the resources of the big core). For example, this may be the case when the workload of that core or compute element is relatively heavily memory bound. The heavily memory bound workload may not exhibit as much performance enhancement when migrated from a small core to a big core as other types of workloads (e.g., highly vectorized multimedia workloads). Accordingly, in some embodiments, information about the expected speedup or "scalability" of migrating the workload from the lower computational capability and lower power consumption compute element to the higher computational capability and higher power consumption compute element may be included in the evaluation of the migration benefit.

The migration performance benefit evaluation logic includes scalability factors monitor logic 316 and scalability evaluation logic 322 which are operable to evaluate scalability for the received performance requests. In some embodiments, this may also be done for any active higher computational capability compute elements. The scalability factors monitor logic is operable to gather scalability information for workloads currently being performed on the lower computational capability compute elements that is useful to allow the scalability evaluation logic 322 to evaluate or estimate the speedup or scalability of migrating the workload from the lower computational capability compute elements to a higher computational capability compute element. In some embodiments, the scalability may also be evaluated in terms of performance per unit power (e.g., performance per watt). This may be done in different ways in different embodiments. In various embodiments, this may involve counting or monitoring the occurrence of events during the workload (e.g., with performance monitoring counters), categorizing the type of workload into one of a number of predetermined types having varying levels of speedup/scalability (e.g., workload type 1 has level 1 of speedup/scalability, workload type 2 has level 2 of speedup/scalability, etc.), accessing historical information preserved about the speedup/scalability of a similar type of workload (e.g., a previous instance of a thread, a similar thread, etc.), or the like, or a combination of such approaches.

In one particular example embodiment, the scalability factors monitor logic 316 may be operable to monitor and count the occurrences of a number of different types of events related to the scalability during the workload, and the scalability evaluation logic 322 may be operable to estimate the speedup/scalability of the workload based on these monitored events and based on the differences between the lower and higher computational capability compute elements (e.g., microarchitectural scaling based on their different microarchitectures). In some embodiments, pipeline stall type counters (e.g., memory stalls, etc.), pipeline throughput type counters (e.g., instructions issued, instructions retired, etc.), memory bandwidth type counters (e.g., cache hierarchy miss/hit counters, etc.), or the like, or a combination of such parameters, may be used as indicative of factors that may tend to affect scalability.

Referring again to FIG. 3, migration candidate determination logic 324 is coupled with the scalability evaluation logic 322, the performance request receipt logic 318, and the utilization evaluation logic 320. The migration candidate determination logic is operable to determine a set of zero or more candidates to consider further for migration based on the received performance requests from the performance request receipt logic, the utilization information from the utilization evaluation logic, and the scalability information from the scalability evaluation logic. This may be done in different ways in different embodiments. In some embodiments, candidates with both relatively high utilizations and relatively high scalabilities may be considered further as candidates, whereas candidates with relatively low utilizations and/or relatively low scalabilities may be eliminated as candidates. For example, in one embodiment, a product or other combination of the utilization (e.g., proportion of un-halted cycles) and the scalability may be evaluated for each of the candidates, and one or more candidates with the highest products or combinations may be retained as candidates. The number of candidates retained may tend to depend on the number of migrations to be permitted, which itself may depend upon the number of higher computational capability compute elements in the processor. Accordingly, the migration candidate determination logic 324 may select a subset of candidates that it considers would benefit most from migration.

In some embodiments, utilization and threshold comparison logic 328 may optionally be included to eliminate any candidate with a utilization that does not meet (e.g., equal or exceed) a minimum utilization threshold and/or a scalability that does not meet (e.g., equal or exceed) a minimum scalability threshold. That is, in some embodiments, each of utilization and scalability may be used as a separate logical low pass filter criteria to eliminate certain candidates with either a low utilization and/or a low scalability. This approach may help to ensure that both utilization and scalability are above a corresponding threshold. Alternatively, the determination may be made based on the product or other combination of the utilization and scalability rather than based on individual thresholds. In other words, even though the migration candidate determination logic 324 may have determined what it perceives as the best candidates for migration, the threshold comparison logic 328 may be included to ensure that any of these best candidates to be migrated satisfy certain desirable criteria or thresholds. Other ways of deciding which workloads to migrate are also contemplated. For example, while the illustrated embodiment includes logic 324 and logic 328, other embodiments may use a single logic to make a single determination rather than the two-staged determination described.

As shown, in some embodiments, the migration performance benefit evaluation logic 310 may optionally include threadedness evaluation logic 326, although this is not required. The threadedness evaluation logic may be operable to evaluate the threadedness characteristics of the workload candidates for migration. In some embodiments, the threadedness evaluation logic may perform such evaluation to determine whether or not these threadedness characteristics indicate that the candidate workloads are good candidates for migration or not. In some embodiments, the threadedness evaluation logic may perform such evaluation to determine whether or not the threadedness characteristics indicate a particular way in which the candidate workloads should be mapped to the higher computational capability compute elements. This may be done in different ways in different embodiments.

In some embodiments, the threadedness evaluation logic 326 may include single and/or dominant thread check logic. The single/dominant thread check logic may be operable to check whether or not a workload, which is a candidate for migration, is a single thread, or is a dominant thread of a set of threads. For example, such single thread and/or dominant thread check logic may be useful in embodiments where there is a single higher computational capability single threaded compute element. In some embodiments, migration to the single higher computational capability compute element may be used primarily for either a single thread or a dominant thread of a multi-threaded workload. Workloads that equally utilize multiple cores may instead be run on multiple lower computational capability and lower power consumption compute elements. This check may help to ensure that the thread to be migrated will be beneficial for system performance and responsiveness. This check may help to avoid the energy cost of operating on a higher power compute element when there are multiple threads running with high degree of concurrency and/or interrelatedness such that running one of them on the higher power compute element would not provide much increase in actual performance. For example, this may be the case if a consumer thread consumes data produced by a producer thread such that the consumer thread will generally not speed up much unless the producer thread also speeds up.

Such a single thread/dominant thread check may be implemented in different ways in different embodiments. In one embodiment, this may be based on the number of simultaneously active threads requesting highest performance states over a period of time and compared against tunable set of thresholds. For example, in one particular embodiment a counter may be incremented by a configurable amount when one core is requesting C0P0 with all other cores residing in non-C0P0 states (e.g., CxP0 or C0Px), and decremented by another configurable amount when multiple cores are requesting C0P0. In order to better adapt to changes in workload behavior counter may be implemented as a saturating counter. The counter may be compared against a threshold, and if greater, the migration of the single thread or dominant thread may be permitted to remain in consideration for migration to the higher computational capability and higher power consumption compute element. The threshold may help to ensure that the thread is dominant in a current workload over a period of time.

In other embodiments, the threadedness evaluation logic may evaluate whether or not a subset of threads of a multi-threaded workload are good candidates to migrate to a multithreaded higher computational capability compute element and/or multiple single or multi-threaded higher computational capability compute elements based on their inter-threadedness characteristics. For example, in other embodiments, the threadedness evaluation logic may take into consideration consumer-producer relationships. In still other embodiments, the threadedness evaluation logic may evaluate whether or not it would be beneficial to alternate between swap-out migrating a first set of one or more threads and a second set of one or more threads on one or more higher computational capability compute elements based on their threadedness characteristics.

Referring again to FIG. 3, the dynamic range extension workload migration logic also includes energy and/or thermal budget evaluation logic 312. The energy/thermal budget evaluation logic includes energy and/or thermal budget estimation logic 338 that is operable to estimate an energy and/or thermal budget based on a set of one or more energy and/or thermal parameters 330. Various energy/thermal parameters relevant to the particular implementation may be considered. As shown, in some embodiments, the set of energy/thermal parameters may include a thermal junction temperature (Tj) 332, an external chassis temperature (Tskin) 334, and one or more power/energy consumption and/or delivery parameters (e.g., power consumption, a power delivery, a current delivery, etc.) 336. Various combinations of these and other energy/thermal parameters are suitable for different embodiments.

In some embodiments, the energy/thermal budget threshold comparison logic may be operable to examine the estimated energy/thermal budgets and allow one or more migrations if the processor is operating sufficiently within the energy/thermal budgets to allow the one or more migrations. In some embodiments, use of the higher computational capability and higher power consumption compute elements may only be allowed when the energy/thermal budgets are within the energy/thermal constraints. By way of example, if measured temperatures, power and/or energy, and the like, are all sufficiently below predetermined limits (e.g., factory configured limits, specification limits, limits provided by software, firmware, or a user, or the like), then the processor may determine to perform the migration(s) from one or more lower computational capability and lower power consumption compute elements to one or more higher computational capability and higher power consumption compute elements. In some embodiments, the determination may be based on a minimum desired residency of the workloads on the higher computational capability and higher power consumption compute elements after the migration in order to avoid frequent migration and back-migration, whilst allowing adequate use of the higher computational capability and higher power consumption compute elements when energy/thermal budgets permit. In one particular embodiment, the minimum desired residency on the higher computational capability and higher power consumption compute elements may be on the order of tens of milliseconds, although this is not required.

In some embodiments, continuous or periodic re-measurement of the temperatures, current consumptions, power consumptions, or other energy/thermal budget related parameters, may be made to reassess the energy/thermal budgets over time. When one or more of the measured temperatures, current consumptions, power consumptions, or the like exceed, or are sufficiently close to exceeding the predetermined limits, then the processor may determine to migrate the workload back to the lower computational capability and lower power consumption compute elements. This may help to make sure that the energy/thermal budgets are not exceeded. Alternatively, if the energy/thermal budgets are not violated, the workloads may stay on the higher computational capability and higher power consumption compute elements until they complete or until their performance benefit characteristics change such that their deployment on the higher computational capability compute elements is no longer deemed by the processor logic to be appropriate.

Migration logic 314 is operable to receive the outputs of the migration performance benefit evaluation logic (e.g., the utilization and scalability threshold comparison logic 328 and the logic 326) and the energy/thermal budget evaluation logic 312. If the migration benefit evaluation logic determines that one or more workload migrations are beneficial, and the energy/thermal budget evaluation logic determines that energy/thermal budget constraints permit the one more migrations, then the migration logic may perform the one or more workload migrations. For example, if the higher computational capability compute element is not active it may be activated, and the context associated with the migrated workload (e.g., contents of registers, execution state, etc.) may be migrated to the higher computational capability compute element. If the higher computational capability compute element already has a workload that is to be replaced by the newly migrated workload, then the context of the workload on the higher computational capability compute element may be migrated back to a lower computational capability compute element, and a context of the newly migrated workload may be migrated from a lower computational capability compute element to the higher computational capability compute element.

A workload may be demoted from the higher computational capability compute element back to one of the lower computational capability compute elements if at some point the workload does not meet the migration performance benefit evaluation criteria previously described (e.g., the operating system removes a P0 request for the workload, the utilization of the workload drops below a minimum threshold, the scalability of the workload drops below a minimum threshold, etc.). In some embodiments, thresholds for such back migration to the lower computational capability compute element may be different from thresholds for forward migration to the higher computational capability compute element in order to impose a hysteresis that may help to prevent frequent switching between migration and back-migration which has overhead (e.g., to swap context, etc.). A workload may also be demoted from the higher computational capability compute element back to one of the lower computational capability compute elements if at some point another workload has a more favorable migration performance benefit and/or that other workload is otherwise deemed better to execute on the higher computational capability compute element. A workload may also be demoted from the higher computational capability and higher power consumption compute element back to one of the lower computational capability and lower power consumption compute elements if there is insufficient energy/thermal budget.

The above-described embodiments are only a few of the possible and contemplated ways of implementing dynamic range migration logic. Other embodiments may use either more sophisticated approaches (e.g., incorporating additional factors), simpler approaches (e.g., omitting some of the considered factors), or just different approaches, to determine whether or not to perform the migration. For example, other embodiments may be based on a subset of utilization, scalability, and threadedness considerations. As another example, other embodiments may be based on other factors (e.g., input from workload monitoring software, additional input from the operating system, etc.). As yet another example, other embodiments may make determinations autonomously or separately from indications from the operating system (e.g., not based on OS performance requests).

Figure 4:
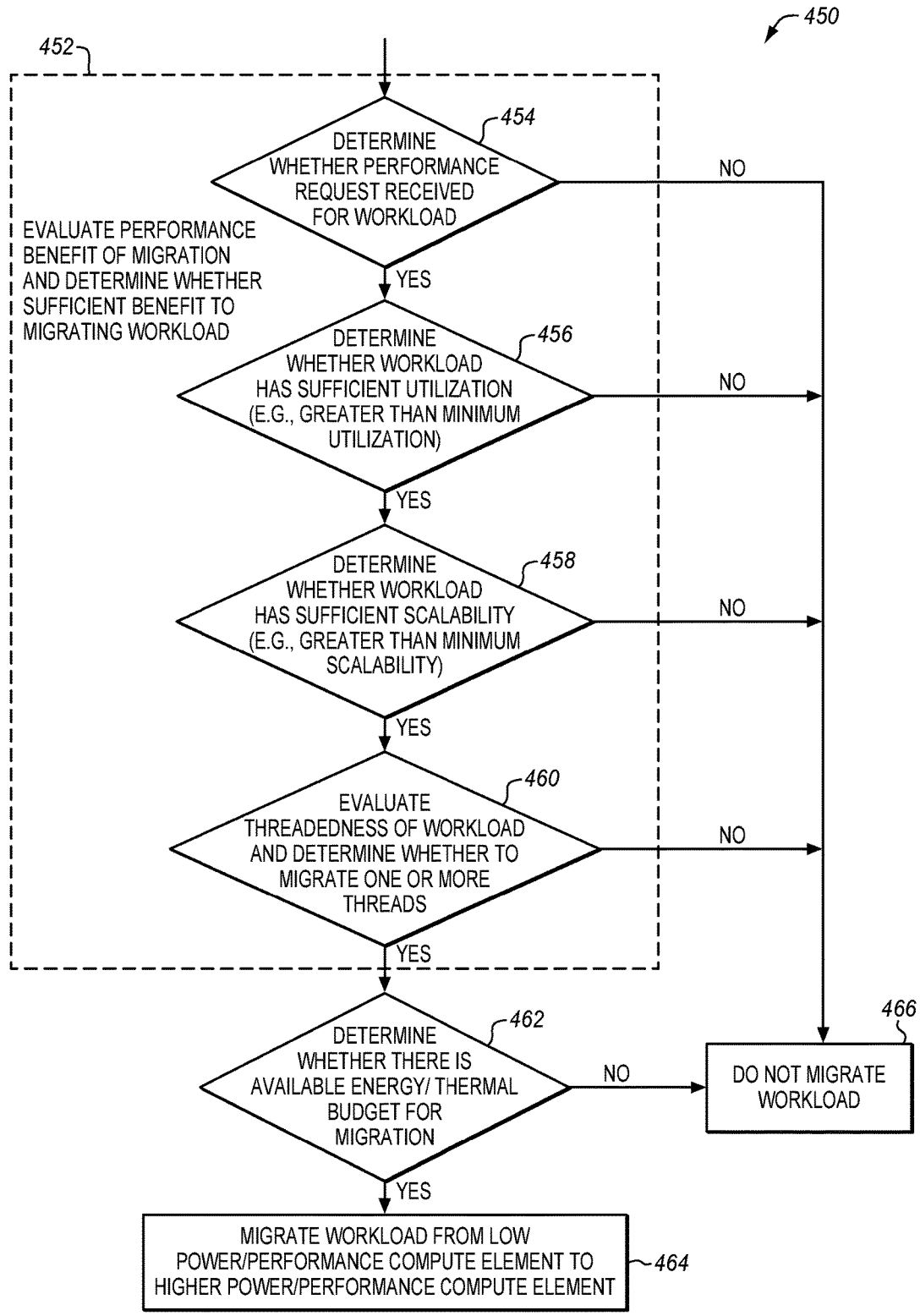
FIG. 4 is a block flow diagram of a detailed example embodiment of a method of determining whether or not to migrate a workload to a higher computational capability and higher power consumption compute element.

FIG. 4 is a block flow diagram of an embodiment of a method 450 of determining whether or not to migrate a workload from a lower computational capability and lower power consumption compute element to a higher computational capability and higher power consumption compute element. In some embodiments, the operations or method of FIG. 4 may be performed by the system of FIG. 1, the processor of FIG. 2, and/or the logic of FIG. 3. Alternatively, the operations or method of FIG. 4 may be performed by similar or entirely different systems, processors, or logic. Moreover, the system of FIG. 1, the processor of FIG. 2, and/or the logic of FIG. 3 may perform the same, similar, or entirely different operations and methods than those of FIG. 4. The components, features, and specific optional details described herein for an apparatus (e.g., a system, processor, or logic) may also optionally apply to the operations and methods described herein, which in embodiments may be performed by and/or with such an apparatus.

The method includes evaluating a performance benefit of the migration of the workload and determining whether there is sufficient performance benefit to migrating the workload, at block 452. As shown, in some embodiments, this may include performing the operations of blocks 454, 456, 458, 460. Other embodiments may perform a subset of these operations, or other operations entirely, as previously described.

At block 454 a determination may be made whether a performance request has been received for the workload. For example, in some embodiments, the performance request may be a request for a high or highest performance state from an operating system. If such a performance request has been received (i.e., "yes" is the determination at block 454) then the method may advance to block 456.

At block 456 a determination may be made whether the workload for which the performance request was received has a sufficient utilization. For example, in some embodiments, this may include determining whether the utilization meets a minimum threshold. If the workload has sufficient utilization (i.e., "yes" is the determination at block 456) then the method may advance to block 458.

At block 458 a determination may be made whether the workload for which the performance request was received has a sufficient scalability. For example, in some embodiments, this may include determining whether the scalability meets a minimum threshold. If the workload has sufficient scalability (i.e., "yes" is the determination at block 458) then the method may advance to block 460.

At block 460, the threadedness of the workload may be evaluated and a determination may be made whether or not it is beneficial to migrate one or more threads based on the evaluated threadedness of the workload. As mentioned above, in some embodiments (e.g., when there is a single higher computational capability compute element), this may include determining whether the workload has a single thread or a dominant thread. In other embodiments, this may include evaluating the interrelation between a set of threads (e.g., consumer-producer relationships, etc.). If it is beneficial (i.e., "yes" is the determination at block 460) then the method may advance to block 462.

At block 462, available energy and/or thermal budgets may be evaluated and a determination may be made whether there is available energy and/or thermal budget for the migration. If there is available energy and/or thermal budget for the migration (i.e., "yes" is the determination at block 462) then the method may advance to block 464. At block 464, the workload may be migrated from the lower computational capability and lower power consumption compute element to the higher computational capability and higher power consumption compute element. Alternatively, if "no" is the determination at any of blocks 454, 456, 458, 460, or 462 then the method may advance to block 466 where the workload is not migrated.

To avoid obscuring the description, relatively simple processors have been shown and described. In other embodiments, the processors may optionally include other components, such as, for example, an instruction fetch unit, an instruction scheduling unit, a branch prediction unit, instruction and data caches, instruction and data translation lookaside buffers, prefetch buffers, microinstruction queues, microinstruction sequencers, bus interface units, second or higher level caches, a retirement unit, a register renaming unit, other components included in processors, and various combinations thereof. There are literally numerous different combinations and configurations of components in processors, and embodiments are not limited to any particular combination or configuration. The processor may represent an integrated circuit or set of one or more semiconductor dies or chips (e.g., a single die or chip, or a package incorporating two or more die or chips). In some embodiments, the processor may represent a system-on-chip (SoC).

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram
FIG. 5A is a block diagram illustrating both an exemplary in-order pipeline and an exemplary register renaming, out-of-order issue/execution pipeline according to embodiments of the invention. FIG. 5B is a block diagram illustrating both an exemplary embodiment of an in-order architecture core and an exemplary register renaming, out-of-order issue/execution architecture core to be included in a processor according to embodiments of the invention. The solid lined boxes in FIGS. 5A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 5A, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. FIG. 5B shows processor core 590 including a front end unit 530 coupled to an execution engine unit 550, and both are coupled to a memory unit 570. The core 590 may be a reduced instruction set computing (RISC) core, a complex instruction set computing (CISC) core, a very long instruction word (VLIW) core, or a hybrid or alternative core type. As yet another option, the core 590 may be a special-purpose core, such as, for example, a network or communication core, compression engine, coprocessor core, general purpose computing graphics processing unit (GPGPU) core, graphics core, or the like.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (or decoder) may decode instructions, and generate as an output one or more micro-operations, micro-code entry points, microinstructions, other instructions, or other control signals, which are decoded from, or which otherwise reflect, or are derived from, the original instructions. The decode unit 540 may be implemented using various different mechanisms. Examples of suitable mechanisms include, but are not limited to, look-up tables, hardware implementations, programmable logic arrays (PLAs), microcode read only memories (ROMs), etc. In one embodiment, the core 590 includes a microcode ROM or other medium that stores microcode for certain macroinstructions (e.g., in decode unit 540 or otherwise within the front end unit 530). The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations, central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 558 comprises a vector registers unit, a write mask registers unit, and a scalar registers unit. These register units may provide architectural vector registers, vector mask registers, and general purpose registers. The physical register file(s) unit(s) 558 is overlapped by the retirement unit 554 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which includes a data TLB unit 572 coupled to a data cache unit 574 coupled to a level 2 (L2) cache unit 576. In one exemplary embodiment, the memory access units 564 may include a load unit, a store address unit, and a store data unit, each of which is coupled to the data TLB unit 572 in the memory unit 570. The instruction cache unit 534 is further coupled to a level 2 (L2) cache unit 576 in the memory unit 570. The L2 cache unit 576 is coupled to one or more other levels of cache and eventually to a main memory.

By way of example, the exemplary register renaming, out-of-order issue/execution core architecture may implement the pipeline 500 as follows: 1) the instruction fetch 538 performs the fetch and length decoding stages 502 and 504; 2) the decode unit 540 performs the decode stage 506; 3) the rename/allocator unit 552 performs the allocation stage 508 and renaming stage 510; 4) the scheduler unit(s) 556 performs the schedule stage 512; 5) the physical register file(s) unit(s) 558 and the memory unit 570 perform the register read/memory read stage 514; the execution cluster 560 perform the execute stage 516; 6) the memory unit 570 and the physical register file(s) unit(s) 558 perform the write back/memory write stage 518; 7) various units may be involved in the exception handling stage 522; and 8) the retirement unit 554 and the physical register file(s) unit(s) 558 perform the commit stage 524.

The core 590 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 590 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 534/574 and a shared L2 cache unit 576, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 6B:
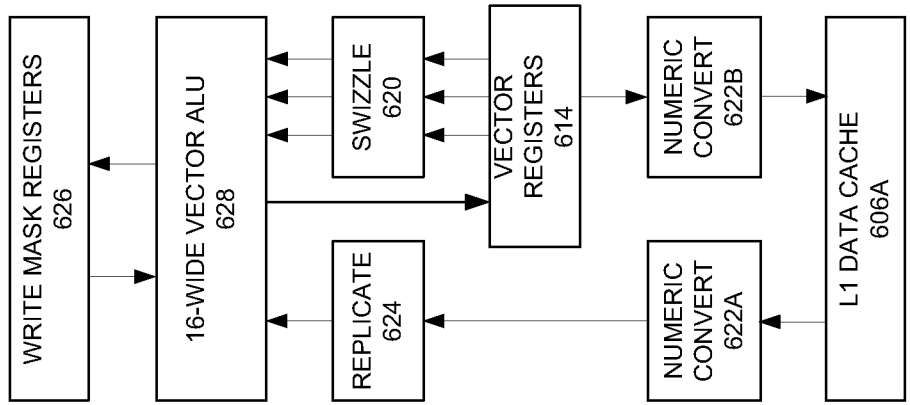
FIG. 6B is an expanded view of part of the processor core in FIG. 6A according to embodiments of the invention.
Figure 6A:
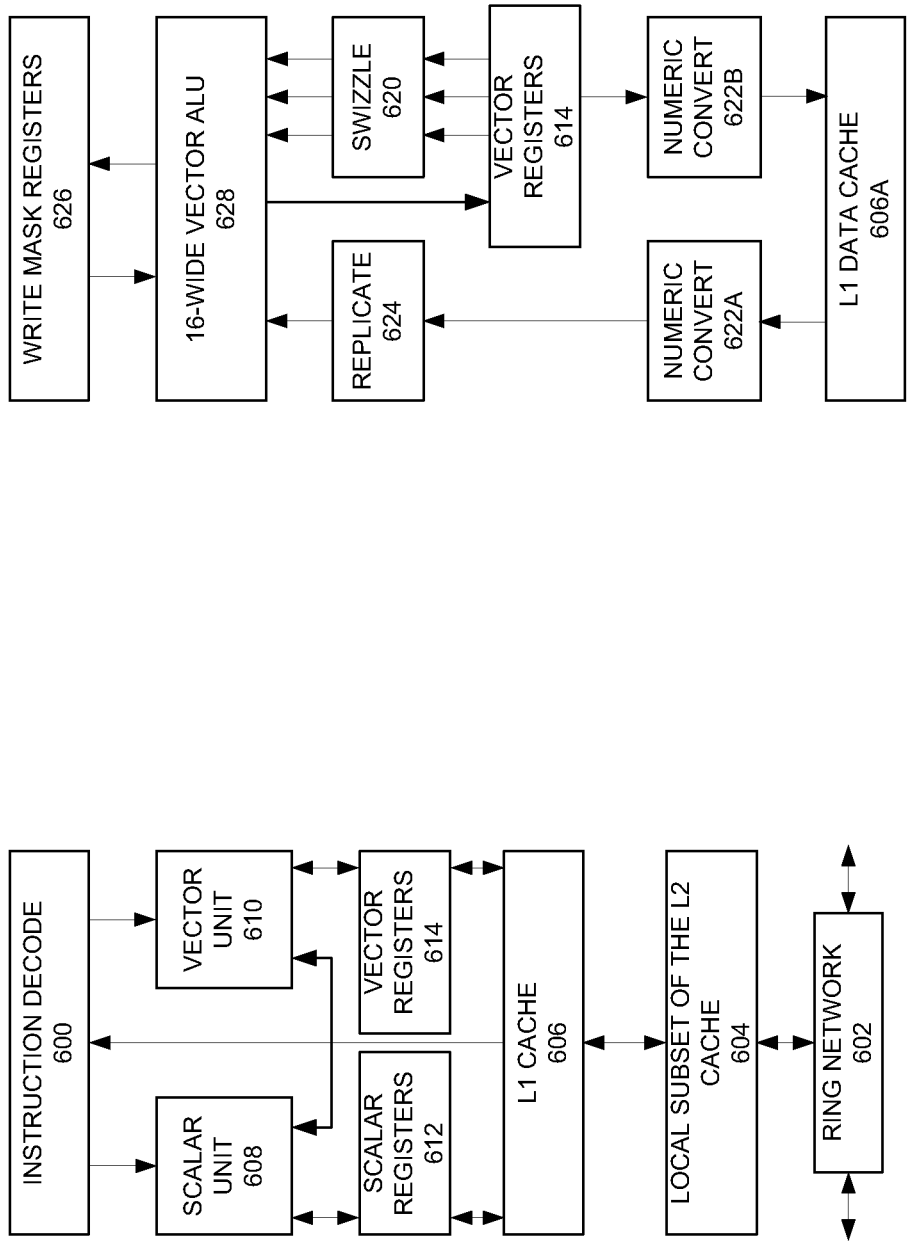
FIG. 6A is a block diagram of a single processor core, along with its connection to the on-die interconnect network and with its local subset of the Level 2 (L2) cache, according to embodiments of the invention.

FIGS. 6A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 6A is a block diagram of a single processor core, along with its connection to the on-die interconnect network 602 and with its local subset of the Level 2 (L2) cache 604, according to embodiments of the invention. In one embodiment, an instruction decoder 600 supports the x86 instruction set with a packed data instruction set extension. An L1 cache 606 allows low-latency accesses to cache memory into the scalar and vector units. While in one embodiment (to simplify the design), a scalar unit 608 and a vector unit 610 use separate register sets (respectively, scalar registers 612 and vector registers 614) and data transferred between them is written to memory and then read back in from a level 1 (L1) cache 606, alternative embodiments of the invention may use a different approach (e.g., use a single register set or include a communication path that allow data to be transferred between the two register files without being written and read back).

The local subset of the L2 cache 604 is part of a global L2 cache that is divided into separate local subsets, one per processor core. Each processor core has a direct access path to its own local subset of the L2 cache 604. Data read by a processor core is stored in its L2 cache subset 604 and can be accessed quickly, in parallel with other processor cores accessing their own local L2 cache subsets. Data written by a processor core is stored in its own L2 cache subset 604 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 6B is an expanded view of part of the processor core in FIG. 6A according to embodiments of the invention. FIG. 6B includes an L1 data cache 606A part of the L1 cache 604, as well as more detail regarding the vector unit 610 and the vector registers 614. Specifically, the vector unit 610 is a 16-wide vector processing unit (VPU) (see the 16-wide ALU 628), which executes one or more of integer, single-precision float, and double-precision float instructions. The VPU supports swizzling the register inputs with swizzle unit 620, numeric conversion with numeric convert units 622A-B, and replication with replication unit 624 on the memory input. Write mask registers 626 allow predicating resulting vector writes.

Processor with Integrated Memory Controller and Graphics

Figure 7:
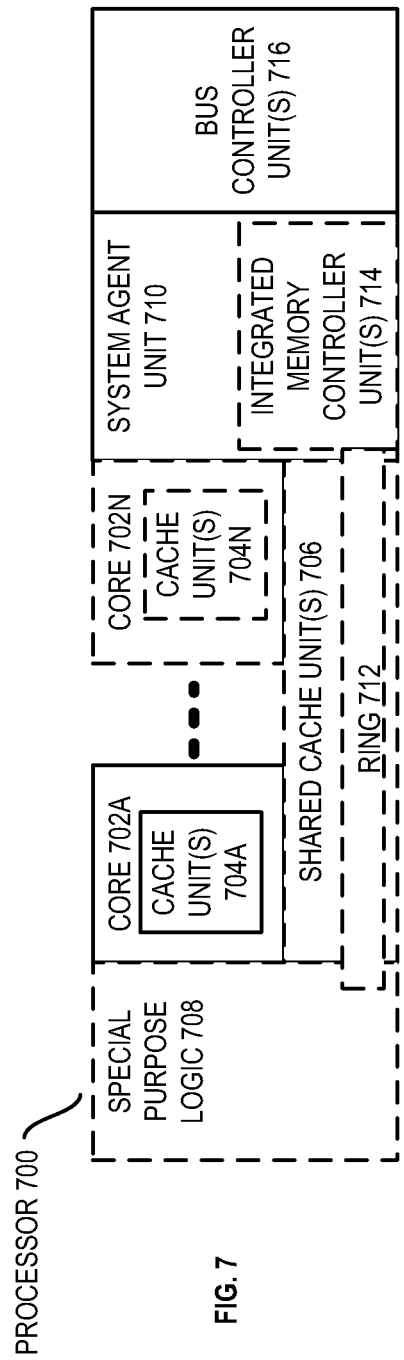
FIG. 7 is a block diagram of a processor that may have more than one core, may have an integrated memory controller, and may have integrated graphics according to embodiments of the invention.

FIG. 7 is a block diagram of a processor 700 that may have more than one core, may have an integrated memory controller, and may have integrated graphics according to embodiments of the invention. The solid lined boxes in FIG. 7 illustrate a processor 700 with a single core 702A, a system agent 710, a set of one or more bus controller units 716, while the optional addition of the dashed lined boxes illustrates an alternative processor 700 with multiple cores 702A-N, a set of one or more integrated memory controller unit(s) 714 in the system agent unit 710, and special purpose logic 708.

Thus, different implementations of the processor 700 may include: 1) a CPU with the special purpose logic 708 being integrated graphics and/or scientific (throughput) logic (which may include one or more cores), and the cores 702A-N being one or more general purpose cores (e.g., general purpose in-order cores, general purpose out-of-order cores, a combination of the two); 2) a coprocessor with the cores 702A-N being a large number of special purpose cores intended primarily for graphics and/or scientific (throughput); and 3) a coprocessor with the cores 702A-N being a large number of general purpose in-order cores. Thus, the processor 700 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 700 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 706, and external memory (not shown) coupled to the set of integrated memory controller units 714. The set of shared cache units 706 may include one or more mid-level caches, such as level 2 (L2), level 3 (L3), level 4 (L4), or other levels of cache, a last level cache (LLC), and/or combinations thereof. While in one embodiment a ring based interconnect unit 712 interconnects the integrated graphics logic 708, the set of shared cache units 706, and the system agent unit 710/integrated memory controller unit(s) 714, alternative embodiments may use any number of well-known techniques for interconnecting such units. In one embodiment, coherency is maintained between one or more cache units 706 and cores 702-A-N.

In some embodiments, one or more of the cores 702A-N are capable of multi-threading. The system agent 710 includes those components coordinating and operating cores 702A-N. The system agent unit 710 may include for example a power control unit (PCU) and a display unit. The PCU may be or include logic and components needed for regulating the power state of the cores 702A-N and the integrated graphics logic 708. The display unit is for driving one or more externally connected displays.

The cores 702A-N may be homogenous or heterogeneous in terms of architecture instruction set; that is, two or more of the cores 702A-N may be capable of execution the same instruction set, while others may be capable of executing only a subset of that instruction set or a different instruction set.

Exemplary Computer Architectures

FIGS. 8-11 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 8:
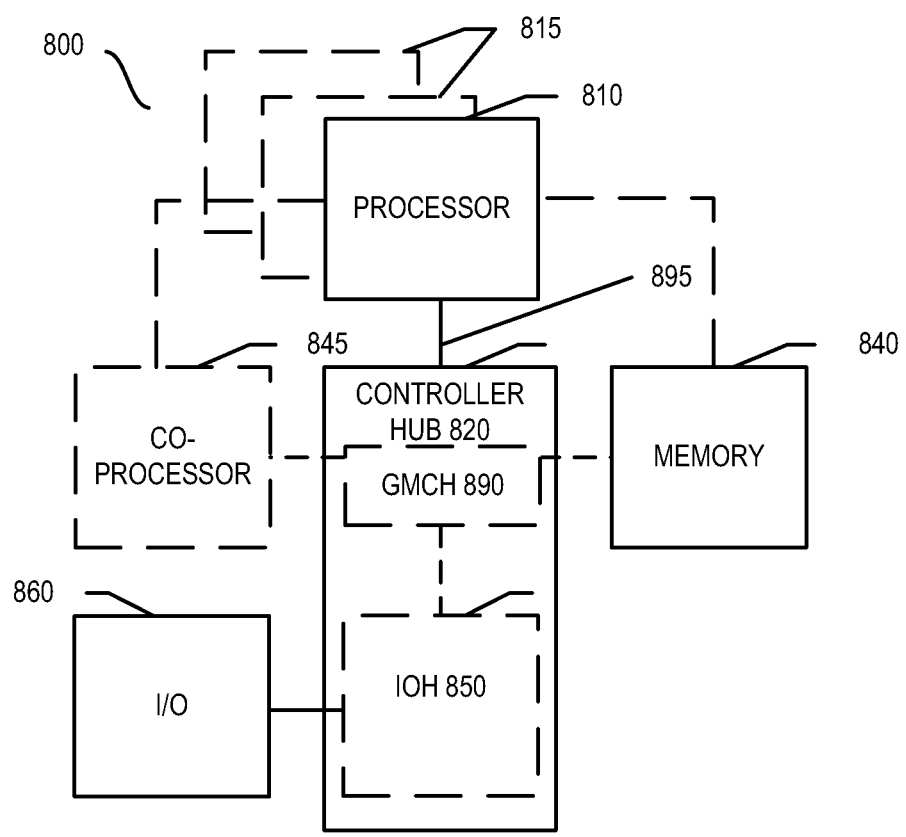
FIG. 8 shown is a block diagram of a system in accordance with one embodiment of the present invention.

Referring now to FIG. 8, shown is a block diagram of a system 800 in accordance with one embodiment of the present invention. The system 800 may include one or more processors 810, 815, which are coupled to a controller hub 820. In one embodiment the controller hub 820 includes a graphics memory controller hub (GMCH) 890 and an Input/Output Hub (IOH) 850 (which may be on separate chips); the GMCH 890 includes memory and graphics controllers to which are coupled memory 840 and a coprocessor 845; the IOH 850 is couples input/output (I/O) devices 860 to the GMCH 890. Alternatively, one or both of the memory and graphics controllers are integrated within the processor (as described herein), the memory 840 and the coprocessor 845 are coupled directly to the processor 810, and the controller hub 820 in a single chip with the IOH 850.

The optional nature of additional processors 815 is denoted in FIG. 8 with broken lines. Each processor 810, 815 may include one or more of the processing cores described herein and may be some version of the processor 700.

The memory 840 may be, for example, dynamic random access memory (DRAM), phase change memory (PCM), or a combination of the two. For at least one embodiment, the controller hub 820 communicates with the processor(s) 810, 815 via a multi-drop bus, such as a frontside bus (FSB), point-to-point interface such as QuickPath Interconnect (QPI), or similar connection 895.

In one embodiment, the coprocessor 845 is a special-purpose processor, such as, for example, a high-throughput MIC processor, a network or communication processor, compression engine, graphics processor, GPGPU, embedded processor, or the like. In one embodiment, controller hub 820 may include an integrated graphics accelerator.

There can be a variety of differences between the physical resources 810, 815 in terms of a spectrum of metrics of merit including architectural, microarchitectural, thermal, power consumption characteristics, and the like.

In one embodiment, the processor 810 executes instructions that control data processing operations of a general type. Embedded within the instructions may be coprocessor instructions. The processor 810 recognizes these coprocessor instructions as being of a type that should be executed by the attached coprocessor 845. Accordingly, the processor 810 issues these coprocessor instructions (or control signals representing coprocessor instructions) on a coprocessor bus or other interconnect, to coprocessor 845. Coprocessor(s) 845 accept and execute the received coprocessor instructions.

Figure 9:
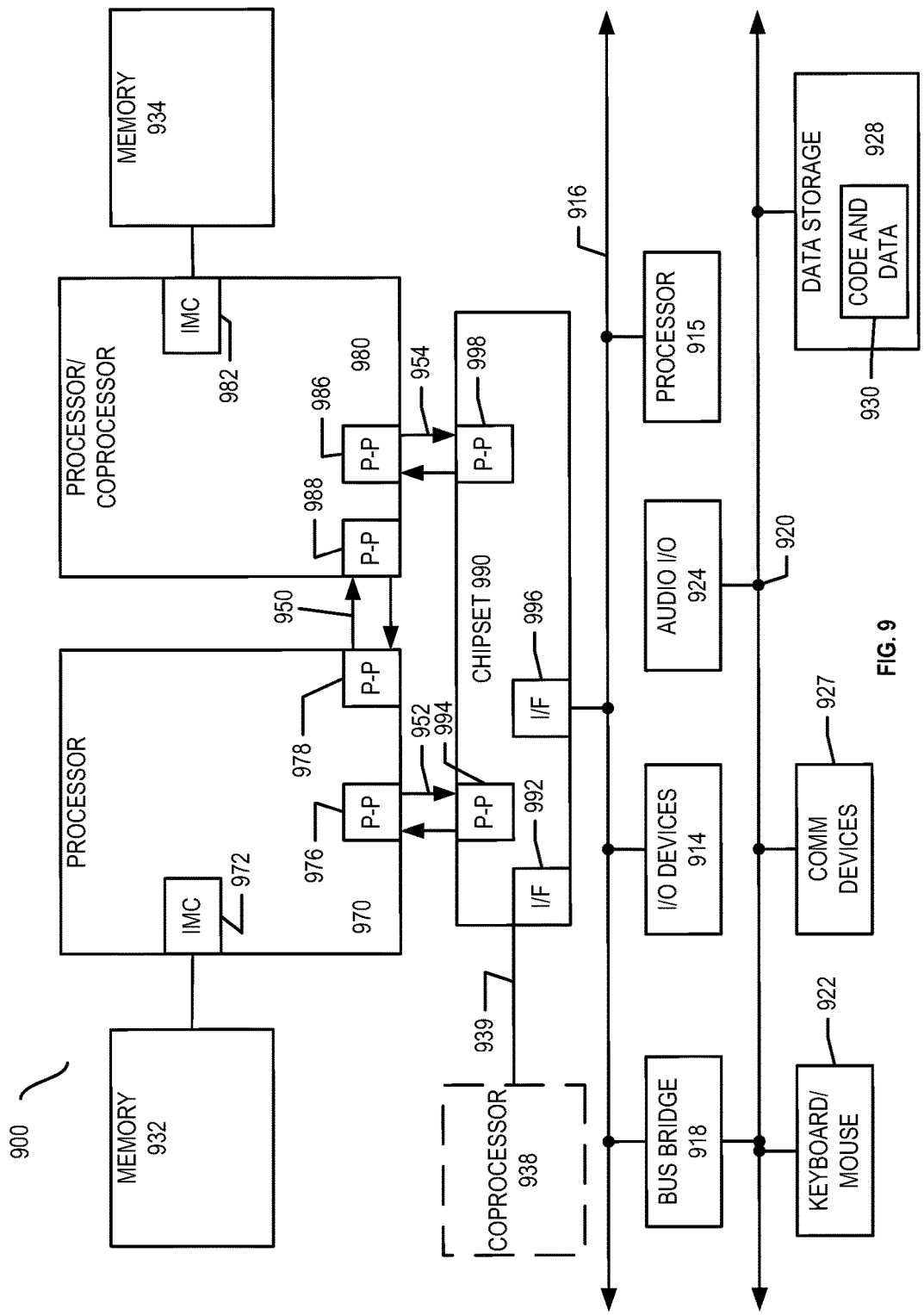
FIG. 9 shown is a block diagram of a first more specific exemplary system in accordance with an embodiment of the present invention.

Referring now to FIG. 9, shown is a block diagram of a first more specific exemplary system 900 in accordance with an embodiment of the present invention. As shown in FIG. 9, multiprocessor system 900 is a point-to-point interconnect system, and includes a first processor 970 and a second processor 980 coupled via a point-to-point interconnect 950. Each of processors 970 and 980 may be some version of the processor 700. In one embodiment of the invention, processors 970 and 980 are respectively processors 810 and 815, while coprocessor 938 is coprocessor 845. In another embodiment, processors 970 and 980 are respectively processor 810 coprocessor 845.

Processors 970 and 980 are shown including integrated memory controller (IMC) units 972 and 982, respectively. Processor 970 also includes as part of its bus controller units point-to-point (P-P) interfaces 976 and 978; similarly, second processor 980 includes P-P interfaces 986 and 988. Processors 970, 980 may exchange information via a point-to-point (P-P) interface 950 using P-P interface circuits 978, 988. As shown in FIG. 9, IMCs 972 and 982 couple the processors to respective memories, namely a memory 932 and a memory 934, which may be portions of main memory locally attached to the respective processors.

Processors 970, 980 may each exchange information with a chipset 990 via individual P-P interfaces 952, 954 using point to point interface circuits 976, 994, 986, 998. Chipset 990 may optionally exchange information with the coprocessor 938 via a high-performance interface 939. In one embodiment, the coprocessor 938 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 990 may be coupled to a first bus 916 via an interface 996. In one embodiment, first bus 916 may be a Peripheral Component Interconnect (PCI) bus, or a bus such as a PCI Express bus or another third generation I/O interconnect bus, although the scope of the present invention is not so limited.

As shown in FIG. 9, various I/O devices 914 may be coupled to first bus 916, along with a bus bridge 918 which couples first bus 916 to a second bus 920. In one embodiment, one or more additional processor(s) 915, such as coprocessors, high-throughput MIC processors, GPGPU's, accelerators (such as, e.g., graphics accelerators or digital signal processing (DSP) units), field programmable gate arrays, or any other processor, are coupled to first bus 916. In one embodiment, second bus 920 may be a low pin count (LPC) bus. Various devices may be coupled to a second bus 920 including, for example, a keyboard and/or mouse 922, communication devices 927 and a storage unit 928 such as a disk drive or other mass storage device which may include instructions/code and data 930, in one embodiment. Further, an audio I/O 924 may be coupled to the second bus 920. Note that other architectures are possible. For example, instead of the point-to-point architecture of FIG. 9, a system may implement a multi-drop bus or other such architecture.

Figure 10:
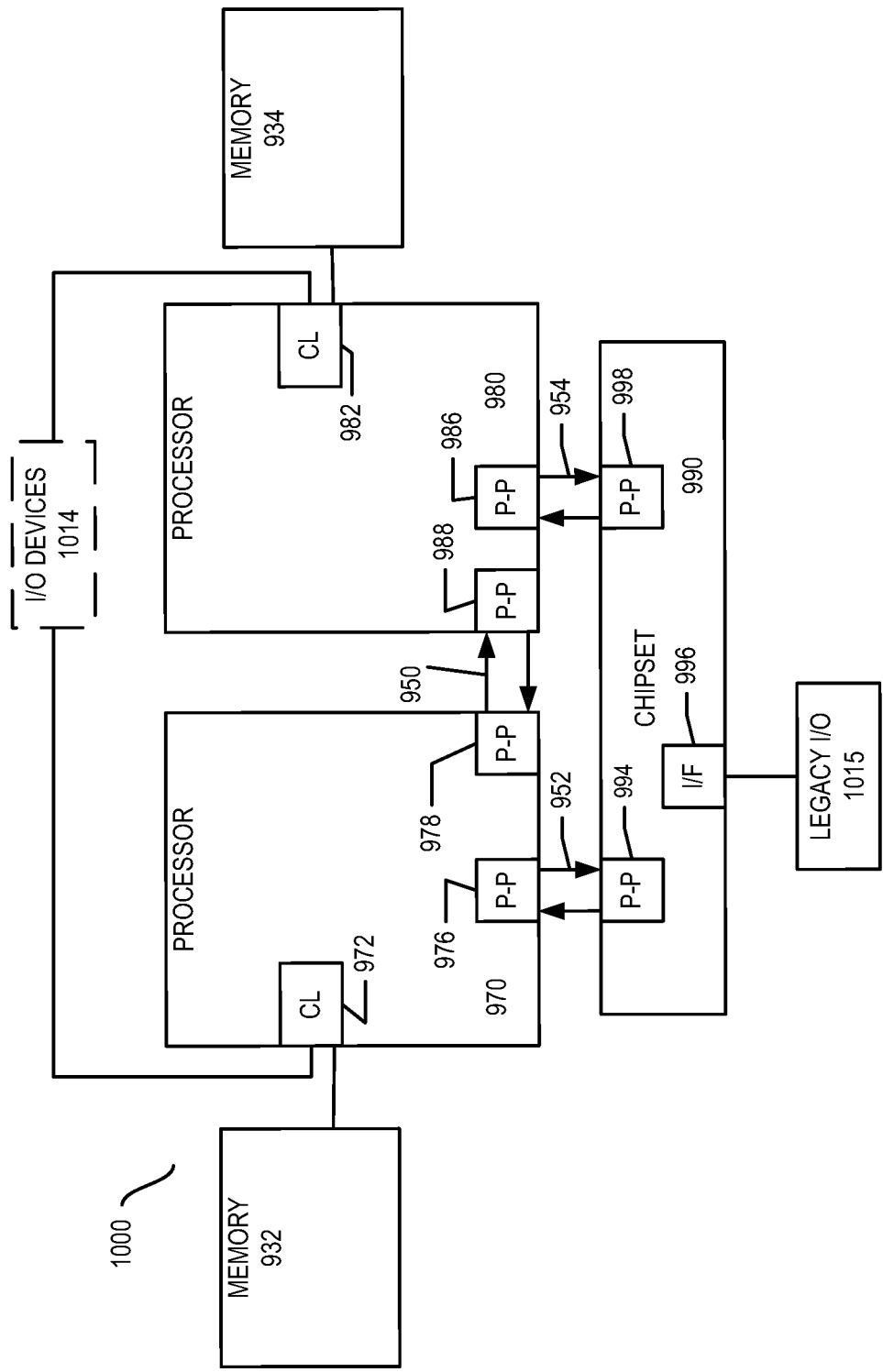
FIG. 10 shown is a block diagram of a second more specific exemplary system in accordance with an embodiment of the present invention.

Referring now to FIG. 10, shown is a block diagram of a second more specific exemplary system 1000 in accordance with an embodiment of the present invention. Like elements in FIGS. 9 and 10 bear like reference numerals, and certain aspects of FIG. 9 have been omitted from FIG. 10 in order to avoid obscuring other aspects of FIG. 10.

FIG. 10 illustrates that the processors 970, 980 may include integrated memory and I/O control logic ("CL") 972 and 982, respectively. Thus, the CL 972, 982 include integrated memory controller units and include I/O control logic. FIG. 10 illustrates that not only are the memories 932, 934 coupled to the CL 972, 982, but also that I/O devices 1014 are also coupled to the control logic 972, 982. Legacy I/O devices 1015 are coupled to the chipset 990.

Figure 11:
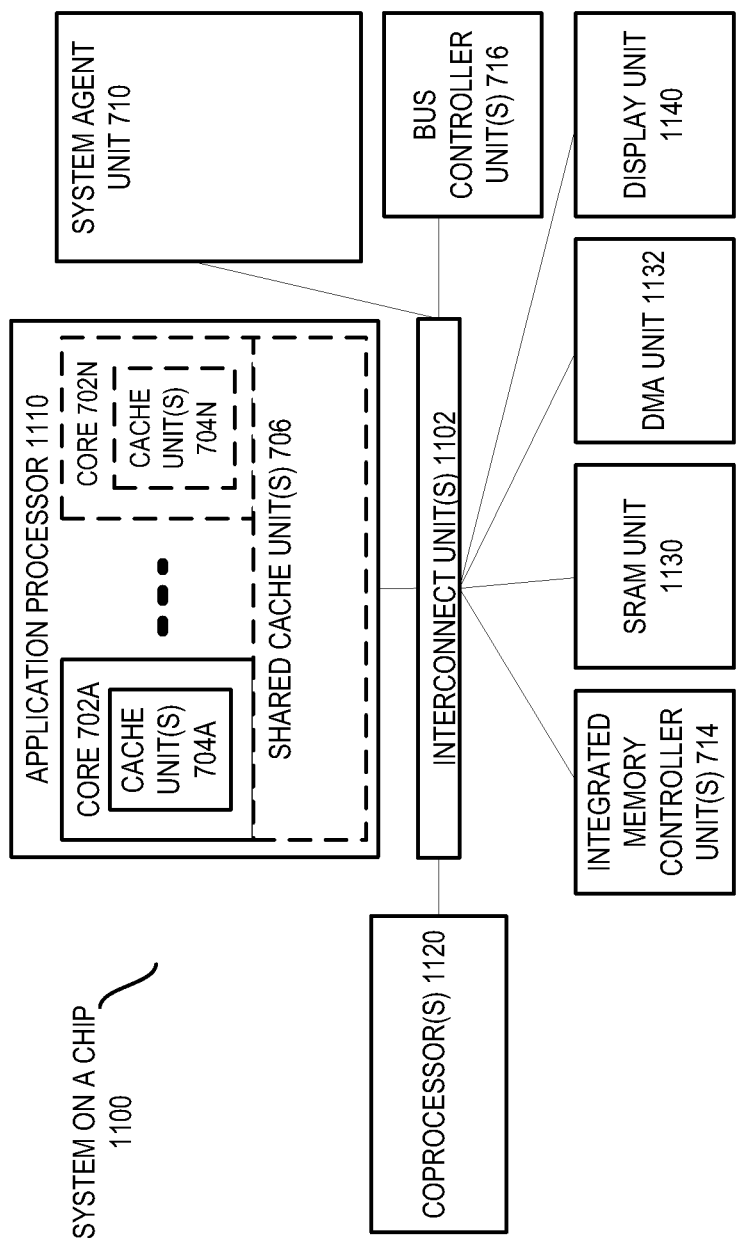
FIG. 11 shown is a block diagram of a SoC in accordance with an embodiment of the present invention.

Referring now to FIG. 11, shown is a block diagram of a SoC 1100 in accordance with an embodiment of the present invention. Similar elements in FIG. 7 bear like reference numerals. Also, dashed lined boxes are optional features on more advanced SoCs. In FIG. 11, an interconnect unit(s) 1102 is coupled to: an application processor 1110 which includes a set of one or more cores 202A-N and shared cache unit(s) 706; a system agent unit 710; a bus controller unit(s) 716; an integrated memory controller unit(s) 714; a set or one or more coprocessors 1120 which may include integrated graphics logic, an image processor, an audio processor, and a video processor; an static random access memory (SRAM) unit 1130; a direct memory access (DMA) unit 1132; and a display unit 1140 for coupling to one or more external displays. In one embodiment, the coprocessor(s) 1120 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 930 illustrated in FIG. 9, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 12:
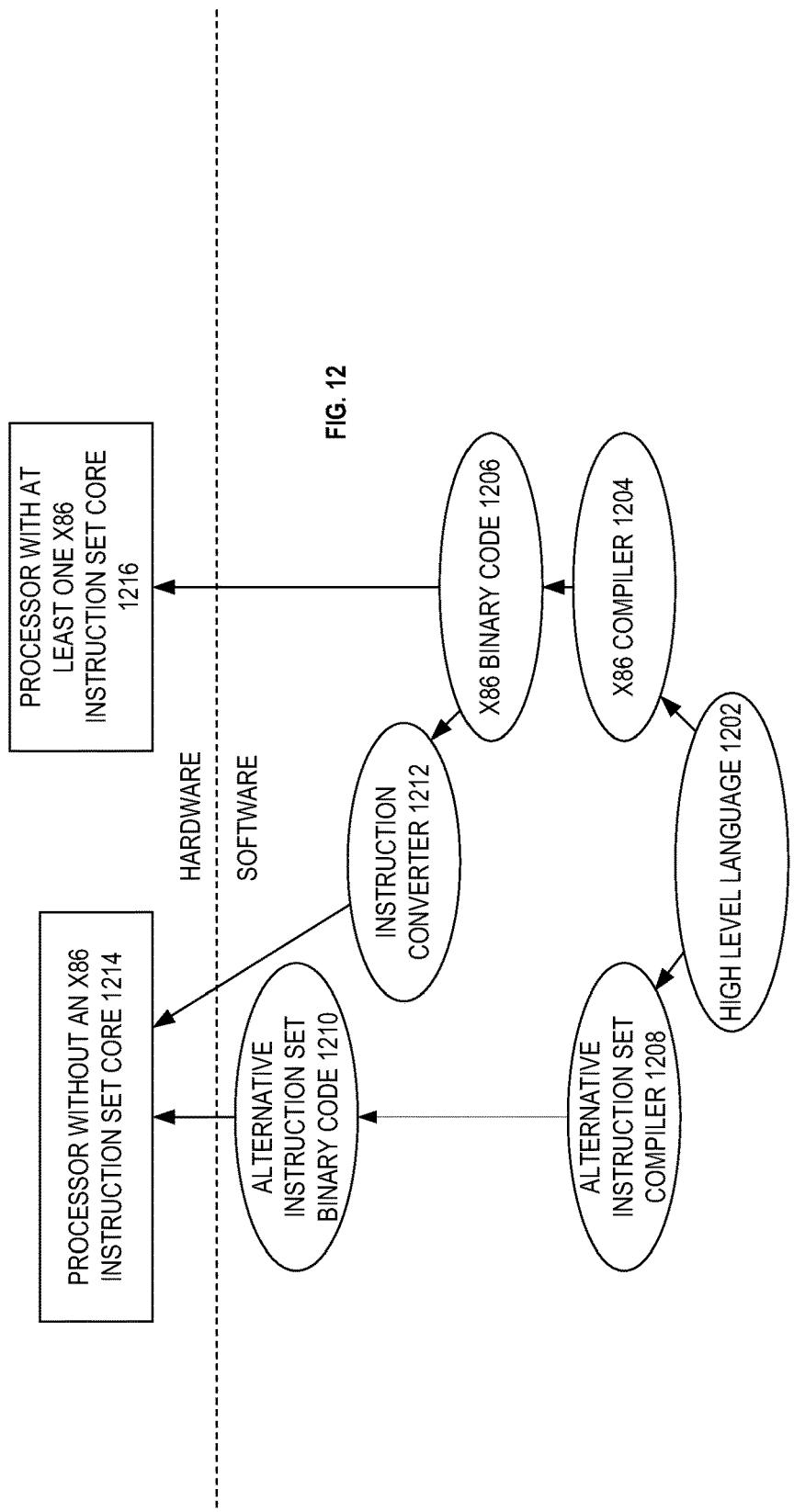
FIG. 12 is a block diagram contrasting the use of a software instruction converter to convert binary instructions in a source instruction set to binary instructions in a target instruction set according to embodiments of the invention.

FIG. 12 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 12 shows a program in a high level language 1202 may be compiled using an x86 compiler 1204 to generate x86 binary code 1206 that may be natively executed by a processor with at least one x86 instruction set core 1216. The processor with at least one x86 instruction set core 1216 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1204 represents a compiler that is operable to generate x86 binary code 1206 (e.g., object code) that can, with or without additional linkage processing, be executed on the processor with at least one x86 instruction set core 1216. Similarly, FIG. 12 shows the program in the high level language 1202 may be compiled using an alternative instruction set compiler 1208 to generate alternative instruction set binary code 1210 that may be natively executed by a processor without at least one x86 instruction set core 1214 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1212 is used to convert the x86 binary code 1206 into code that may be natively executed by the processor without an x86 instruction set core 1214. This converted code is not likely to be the same as the alternative instruction set binary code 1210 because an instruction converter capable of this is difficult to make; however, the converted code will accomplish the general operation and be made up of instructions from the alternative instruction set. Thus, the instruction converter 1212 represents software, firmware, hardware, or a combination thereof that, through emulation, simulation or any other process, allows a processor or other electronic device that does not have an x86 instruction set processor or core to execute the x 86 binary codes 1206.

In the description and claims, the term "logic" may have been used. As used herein, the term logic may include but is not limited to hardware, firmware, software, or a combination thereof. Examples of logic include integrated circuitry, application specific integrated circuits, analog circuits, digital circuits, programmed logic devices, memory devices including instructions, etc. In some embodiments, the logic may include transistors and/or gates potentially along with other circuitry components.

In the description and claims, the terms "coupled" and "connected," along with their derivatives, may have been used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. In the drawings, arrows represent couplings and bidirectional arrows represent bidirectional couplings.

The term "and/or" may have been used. As used herein, the term "and/or" means one or the other or both (e.g., A and/or B means A or B or both A and B).

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. All equivalent relationships to those illustrated in the drawings and described in the specification are encompassed within embodiments of the invention. In other instances, well-known circuits, structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements that may optionally have similar or the same characteristics, unless specified or clearly apparent otherwise.

Various operations and methods have been described. Some of the methods have been described in a relatively basic form in the flow diagrams, but operations may optionally be added to and/or removed from the methods. In addition, while the flow diagrams show a particular order of the operations according to example embodiments, it is to be understood that that particular order is exemplary. Alternate embodiments may optionally perform the operations in different order, combine certain operations, overlap certain operations, etc. Many modifications and adaptations may be made to the methods and are contemplated.

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A processor comprising:
   at least one lower processing capability and lower power consumption physical compute element on a die, the at least one lower processing capability and lower power consumption physical compute element to be visible to first software that is to schedule workloads on the at least one lower processing capability and lower power consumption physical compute element and that is selected from an operating system, a virtual machine monitor, and a micro-kernel;
   at least one higher processing capability and higher power consumption physical compute element on the die, the at least one higher processing capability and higher power consumption physical compute element to be invisible to all software including the first software;
   migration performance benefit evaluation logic on the die and comprising at least one of a circuit and firmware to evaluate a performance benefit of a migration of a first workload from the at least one lower processing capability and lower power consumption physical compute element to the at least one higher processing capability and higher power consumption physical compute element based on receipt of a request for higher performance that is to be received from the first software, and to determine whether or not to allow the migration based on the evaluated performance benefit;
   available energy and thermal budget evaluation logic on the die and comprising at least one of a circuit and firmware to evaluate available energy and thermal budgets of the processor and to determine to allow the migration if the migration fits within the available energy and thermal budgets of the processor or not allow the migration if the migration does not fit within the available energy and thermal budgets of the processor, wherein the available energy and thermal budgets of the processor are shared by the at least one lower processing capability and lower power consumption physical compute element on the die and the at least one higher processing capability and higher power consumption physical compute element on the die; and
   workload migration logic on the die and comprising at least one of a circuit and firmware to perform the migration of the first workload when allowed by both the migration performance benefit evaluation logic and the available energy and thermal budget evaluation logic.

2. The processor of claim 1, wherein the at least one lower processing capability and lower power consumption physical compute element comprises a smaller core, and the at least one higher processing capability and higher power consumption physical compute element comprises a larger core.

3. The processor of claim 1, wherein the workload migration logic is to migrate the first workload transparently to said all software including the first software.

4. The processor of claim 1, wherein the migration performance benefit evaluation logic is to evaluate the performance benefit of the migration based on receipt of the request that is to be received from the first software for a highest performance state for the first workload.

5. The processor of claim 1, wherein the migration performance benefit evaluation logic comprises scalability logic comprising at least one of a circuit and firmware to evaluate a scalability of migration of the first workload to the higher processing capability and higher power consumption physical compute element in terms of performance benefit per unit power.

6. The processor of claim 5, wherein the scalability logic is to evaluate the scalability based at least in part on counts of different types of events that are to occur while the first workload is performed on the at least one lower processing capability and lower power consumption physical compute element.

7. The processor of claim 1, wherein the migration performance benefit evaluation logic comprises utilization evaluation logic comprising at least one of a circuit and firmware to evaluate a utilization of the at least one lower processing capability and lower power consumption physical compute element while performing the first workload.

8. The processor of claim 1, wherein the available energy and thermal budget evaluation logic is to evaluate whether the available energy and thermal budgets of the processor permit performance of the first workload on the at least one higher processing capability and higher power consumption physical compute element for a minimum residency after the migration.

9. The processor of claim 1, wherein the processor is to expose a plurality of virtual cores to the first software and is to remap workloads scheduled on the virtual cores to physical cores transparently to said all software including the first software.

10. A method comprising:
    exposing at least one lower processing capability and lower power consumption physical compute element on a die to first software that schedules workloads on the at least one lower processing capability and lower power consumption physical compute element, the first software selected from an operating system, a virtual machine monitor, and a micro-kernel;
    not exposing at least one higher processing capability and higher power consumption physical compute element on the die to any software including not to the first software;
    evaluating a performance benefit of a migration of a first workload from the at least one lower processing capability and lower power consumption physical compute element on the die to the at least one higher processing capability and higher power consumption physical compute element on the die based on receipt of a request for higher performance that is received from the first software;
evaluating whether the migration of the first workload fits within available energy and thermal budgets that apply to the die;
determining to allow the migration based on the evaluated performance benefit and determining that the migration fits within the available energy and thermal budgets that apply to the die; and
migrating the first workload, with at least one of a circuit and firmware on a die of a processor, from the at least one lower processing capability and lower power consumption physical compute element to the at least one higher processing capability and higher power consumption physical compute element.

11. The method of claim 10, wherein migrating the first workload comprises migrating the first workload from a smaller core to a larger core.

12. The method of claim 10, wherein migrating the first workload comprises migrating the first workload transparently to said any software including the first software.

13. The method of claim 10, wherein evaluating the performance benefit is based at least in part on receipt of a request for a highest performance state for the first workload from the first software.

14. The method of claim 10, wherein evaluating the performance benefit is based at least in part on a utilization of the at least one lower processing capability and lower power consumption physical compute element while performing the first workload.

15. The method of claim 10, wherein evaluating the performance benefit is based at least in part on evaluating a scalability of the migration of the first workload to the at least one higher processing capability and higher power consumption physical compute element in terms of performance benefit per unit power.

16. The method of claim 15, further comprising counting different types of events that occur while the first workload is being performed on the at least one lower processing capability and lower power consumption physical compute element, and wherein the evaluation of the scalability is based at least in part on the counts of the different types of events.

17. The method of claim 10, wherein evaluating the performance benefit is based on:
receipt of a request for a highest performance state for the first workload from software;
a utilization of a compute element while performing the first workload; and
an estimate of how scalable the first workload is from the at least one lower processing capability and lower power consumption physical compute element to the at least one higher processing capability and higher power consumption physical compute element.

18. The method of claim 10, wherein evaluating whether the migration fits within the available energy and thermal budgets comprises evaluating whether the first workload can be performed on the at least one higher processing capability and higher power consumption physical compute element for a minimum residency after the migration within the available energy and thermal budgets.

19. The method of claim 10, further comprising exposing a plurality of virtual cores to software by the processor, and wherein migrating comprises remapping the first workload from a smaller physical core initially mapped to a virtual core on which the first workload was scheduled by software to a larger physical core with the logic of the processor.

20. The method of claim 10, wherein the migrating the first workload is performed with at least one of hardware and firmware of the processor.

21. A system comprising:
a processor, the processor including:
at least one smaller core on a die, the at least one smaller core to be visible to first software that is to schedule workloads on the at least one smaller core and that is selected from an operating system, a virtual machine monitor, and a micro-kernel;
at least one larger core on the die, the at least one larger core to be invisible to all software including the first software;
migration performance benefit evaluation logic comprising at least one of a circuit and firmware to evaluate a performance benefit of a migration of a thread from the at least one smaller core to the at least one larger core based on receipt of a request for higher performance that is to be received from the first software, and to determine whether or not to allow the migration based on the evaluated performance benefit;
available energy and thermal budget evaluation logic on the die and comprising at least one of a circuit and firmware to evaluate available energy and thermal budgets for the die and to determine to allow the migration if the migration fits within the available energy and thermal budgets for the die; and
migration logic comprising at least one of a circuit and firmware to perform the migration of the thread when allowed by both the migration performance benefit evaluation logic and the available energy and thermal budget evaluation logic, wherein the migration logic is to migrate the thread transparently to said all software; and
a dynamic random access memory coupled with the processor.

22. The system of claim 21, wherein the migration performance benefit evaluation logic comprises utilization evaluation logic comprising at least one of a circuit and firmware to evaluate a utilization of the at least one smaller core while performing the thread.

23. The system of claim 22, wherein the migration performance benefit evaluation logic comprises scalability logic comprising at least one of a circuit and firmware to evaluate a scalability of migration of the thread to the at least one larger core in terms of performance benefit per unit power.

24. A processor comprising:
at least one lower processing capability and lower power consumption core on a die, the at least one lower processing capability and lower power consumption core to be visible to first software that is to schedule workloads on the at least one lower processing capability and lower power consumption core and that is selected from an operating system, a virtual machine monitor, and a micro-kernel;
at least one higher processing capability and higher power consumption core on the die, the at least one higher processing capability and higher power consumption core to be invisible to all software including the first software; and at least one of a circuit and firmware on the die to:
evaluate a performance benefit of a migration of a first workload from the at least one lower processing capability and lower power consumption core to the at least one higher processing capability and higher power consumption core, and to determine whether or not to allow the migration based on the evaluated performance benefit;
evaluate available energy and thermal budgets of the processor and to determine to allow the migration if the migration fits within the available energy and thermal budgets of the processor or not allow the migration if the migration does not fit within the available energy and thermal budgets of the processor, wherein the available energy and thermal budgets of the processor are shared by the at least one lower processing capability and lower power consumption core on the die and the at least one higher processing capability and higher power consumption core on the die; and
perform the migration of the first workload when allowed based on the evaluated performance benefit of the migration and when the migration fits within the available energy and thermal budgets of the processor.

25. The processor of claim 24, wherein the performance benefit of the migration is to be evaluated in response to receipt of a request from the first software for a higher performance state for the first workload.

* * * * *